United States Patent [19]

Aruga et al.

[11] Patent Number: 5,036,417
[45] Date of Patent: Jul. 30, 1991

[54] MAGNETIC HEAD FEEDING DEVICE WITH A RACK AND PINION

[75] Inventors: Tomoe Aruga; Hideya Yokouchi, both of Nagano, Japan

[73] Assignee: Seiko Epson Corporation, Tokyo, Japan

[21] Appl. No.: 554,655

[22] Filed: Jul. 19, 1990

Related U.S. Application Data

[63] Continuation of Ser. No. 94,480, Sep. 3, 1987, abandoned.

[30] Foreign Application Priority Data

| Sep. 3, 1986 | [JP] | Japan | 61-207035 |
| Oct. 22, 1986 | [JP] | Japan | 61-251084 |
| Nov. 25, 1986 | [JP] | Japan | 61-280311 |
| Feb. 24, 1987 | [JP] | Japan | 62-40581 |
| Feb. 24, 1987 | [JP] | Japan | 62-40582 |

[51] Int. Cl.$^5$ .................. G11B 5/55; G11B 21/08
[52] U.S. Cl. .................. 360/106; 360/97.01
[58] Field of Search .......... 360/104, 105, 106, 97.01, 360/99.01, 75; 74/89.11, 1.09, 29–30

[56] References Cited

U.S. PATENT DOCUMENTS

| 3,614,579 | 10/1971 | Fulton | 360/106 X |
| 4,143,409 | 3/1979 | Iwabuchi et al. | 360/106 |
| 4,428,012 | 1/1984 | Applequist et al. | 360/106 |
| 4,510,543 | 4/1985 | Ohta et al. | 360/106 |
| 4,654,737 | 3/1987 | Hopkins et al. | 360/106 |
| 4,658,315 | 4/1987 | Seki et al. | 360/104 |
| 4,709,285 | 11/1987 | Enami et al. | 360/104 |

FOREIGN PATENT DOCUMENTS

| 0239973 | 11/1985 | Japan | 360/106 |
| 0005478 | 1/1986 | Japan | 360/106 |
| 0105779 | 5/1986 | Japan | 360/106 |

*Primary Examiner*—David J. Severin
*Attorney, Agent, or Firm*—Kaplan Blum

[57] ABSTRACT

A magnetic head feeding device suitable for mass production while providing a higher tolerance to vibration and shock is provided. A carriage is rotatably and slideably mounted on a guide shaft. A magnetic head is mounted on the carriage as is a rack. A pinion mounted on a motor, engages the rack to move the rack along the guide shaft in a reciprocating fashion when the pinion is rotated. A magnetic coupling between the carriage and a fixed support provides an attractive force which acts as an engagement force between the rack and the pinion without applying a contact force on the carriage. A stop is provided at each end of the rack and is integrally formed with the rack so that the stop prevents the pinion from rotating and the carriage from moving once the carriage has reached a desired outer limit of motion in either direction. A contour wall is integrally formed with the rack at a position opposed to the rack to prevent disengagement of the pinion from the rack.

52 Claims, 16 Drawing Sheets

MAGNETIC HEAD FEEDING DEVICE WITH A RACK AND PINION

This is a continuation of application Ser. No. 07/094,480, filed on Sept. 3, 1987, now abandoned.

BACKGROUND OF THE INVENTION

This invention relates to magnetic head feeding mechanisms in a magnetic recording device, and in particular to a magnetic head feeding mechanism using a rack and a pinion.

Magnetic head feeding mechanisms are known in the art as disclosed in Japanese Utility Second Publication 49-34340 and U.S. Pat. No. 4,428,012. (See FIGS. 1-6 hereof). This prior art feeding device has a guide wherein a carriage is slideably and rotatably mounted on the guide. The magnetic head is mounted on the carriage. A rack is provided on the carriage parallel to the guide. A pinion, mounted on a rotating output shaft of a rotating motor engages the rack. The magnetic head reciprocates along the guide in conjunction with the rotating pinion.

Reference is made to FIG. 1 wherein a perspective view of the prior art device is provided. A guide shaft 51 is affixed on a frame 60 by elastic press plates 59. A carriage 53, supports a magnetic head 52 at a predetermined position, and supports a rack 55. Carriage 53 is guided along guide shaft 51 and is supported upon shaft 51 by metal bushes 68 (FIG. 6). Accordingly, carriage 53 is slideably and rotatably mounted about guide shaft 51. A step motor 56 supported on frame 60, includes an outwardly extending rotating output shaft 61. A pinion 54 is mounted on output shaft 61 and engages rack 55. A spring 58 biases a roller 57 in the direction of arrow A thereby ensuring engagement of rack 55 with pinion 54. Accordingly, as step motor 56 drives rotating output shaft 61, carriage 53 moves along guide shaft 51 without engagement displacement of the rack 55 relative to pinion 54.

Slideable carriage 53 also acts as a stop as it is guided along guide shaft 51. Adjacent slideable carriage 53 is a portion 60a of frame 60 at the one end, and an adjustable screw 62 is mounted on frame 60 adjacent carriage 53 at the other end. As carriage 53 moves in either direction it will eventually contact either adjustable screw 62 or joint 60a, thereby stopping movement in either direction. Accordingly, movement of slideable carriage 53 is limited to this region.

Reference is now made to FIG. 2 wherein the control of the magnetic head feeding device is graphically and schematically shown. In descending order, FIG. 2 depicts the adjustment range of the carriage movement control (adjustable screw 62), the carriage 53 and adjustable screw 62, the direction of rotation of the step motor 56 and track position, and a torque curve of the step motor 56. In the magnetic recording device, the reference track position 00Tr, corresponds to the outermost peripheral track position, and the track position is then set so as to count nTr towards the inner periphery. At 00Tr the phase-position relationship corresponds to an absolute position of carriage 53 and is at a crossing of the torque curve of the step motor 56 with the abscissa.

Therefore, 00Tr is a standard value and the positive integer multiples of Tr are inside the periphery, while, the negative integer multiples of Tr are outside the periphery. For example using a four phase step motor 56 feeding at a rate of 1Tr/1 step, when step motor 56 is excited to the excitement phase at the 00Tr position, step motor 56 exhibits a continuous torque curve which corresponds to the track position of carriage 53. Stepping motor 56 rotates to any track position of $-4Tr$, 00Tr, 4Tr, ..., (n·4) Tr, which correspond to the same excitement phase. The track position to which step motor 56 rotates, depends upon the state of the phase position before excitement. Namely, step motor 56 rotates toward 00Tr when the state of the phase position before excitement is between 2Tr and $-2Tr$.

Carriage 53 moves toward 00Tr in the direction of arrow B (FIG. 2) from the inner peripheral side, then stops at the position corresponding to 00Tr. Due to inertial forces of the rotor of step motor 56 on carriage 53, carriage 53 overshoots the 00Tr position Carriage 53 is prevented from moving into the outer peripheral side beyond $-2Tr$ by adjustable screw 62. X2 represents surplus space up to adjustable screw 62, X1 represents surplus space between the 00Tr position and the actual position of carriage 53 and the diagonally sectioned area between the two is the region in which the position of carriage 53 may be adjusted by adjustable screw 62.

Reference is now made to FIG. 3 and FIG. 4 in which the rack and pinion of the prior art magnetic head feeding mechanism is shown. FIGS. 3 and 4 show three states of pinion 54 relative to rack 55. In order to simplify the explanation, rack 55 is depicted contacting adjustable screw 62.

In normal use pinion 54 rotates in the direction of arrow C, and when rack 55 comes in contact with adjustable screw 62, rack 55 is stopped. However, although rack 55 stops relatively quickly by colliding with adjustable screw 62, pinion 54 does not stop due to its rotational inertia. As a result pinion 54, displaces rack 55 a distance h against spring 58 which is applying pressure in the direction of arrow A. Thus, pinion 54 stops but not before overrotating through an angle in the direction of arrow C. The above action occurs quite easily during movement of the magnetic recording medium.

While engaged, pinion 54 and rack 55 are often subjected to vibration and shock. Therefore, due to the jumping of carriage 53 during such moments and the resonance of spring 58, momentarily spring 58 cannot apply an engagement force between rack 55 and pinion 54. To minimize the jumping and resonance, the force of spring 58 has been greatly increased in the prior art. However, the stronger the engaging force, the larger the deterioration of step motor 56 due to greater frictional forces, further causing larger electrical consumption in order to improve the property of step motor 56. Therefore, there has been no satisfactory method for preventing the above jumping and resonance, that prevents pinion 54 from over-rotating the stop position by angle $\theta$ in the direction of arrow C.

Overrotation will occur even after adjusting adjustable screw 62, and even though carriage 53 stops by abutting adjustable screw 62. As a result step motor 56 exceeds the proper phase position of the excitement phase by overrotating to $-2Tr$. On excitation by a signal having the excitement phase associated with the reference track position 00Tr. (FIG. 2), step motor 56 would rotate in the direction of $-4Tr$. However, carriage 53 is still adjacent to adjustable screw 62, in a stopped position, therefore carriage 53 cannot move in either of two directions, and suffers from what is known as the "tensile phenomenon."

Moreover, when the overrotation of pinion 54 becomes larger than θ, the distance h also increases to the state shown in FIG. 4. Thus, although rack 55 stops relatively quickly by contacting adjustable screw 62, as noted above, pinion 54 cannot stop due to rotational inertia of pinion 54 in the direction of arrow C, causing a larger displacement of rack 55 than the distance h discussed above. This larger displacement alters the engagement of pinion 54 and rack 55, and as a result, the fixed regularity in the relationship between rack position and the phase of the exciting signal depicted in FIG. 2 during engagement of rack 55 and pinion 54 disappears. In other words, the fixed regularity exhibited in the phase-position relationship between the absolute position of carriage 53 and the excitement phase of step motor 56 no longer exists, thereby causing the loss of interchangeability of the magnetic recording medium.

Reference is now also made to FIG. 5 in which a sectional view of a magnetic head mounted in accordance with the conventional magnetic head feeding device is provided A gimbal 64 is mounted on carriage 53, which is composed of plastic material or the like. Magnetic head 52 is mounted on gimbal 64. However, in the conventional magnetic recording device background magnetism often leaks from the motor. Magnetic head 52 has an extremely high magnetic sensitivity so that magnetic head 52 is affected even by a very low level leakage of magnetism from the rest of the magnetic head feeding device. When a motor 66 is provided in close proximity to magnetic head 52 as in the prior art, magnetic head 52 reacts with even smaller amounts of magnetic leakage from motor 66, preventing the natural performance of magnetic head 52. To prevent this interaction, the prior art devices have been provided with a magnetic head shield member 67 mounted on gimbal 64 for shielding the periphery of magnetic head 52 and a magnetic shield member 65 mounted below magnetic head 52 for blocking the leakage of magnetism from motor 66.

Reference is now made to FIG. 6 in which a sectional view of the prior art magnetic head feeding device is provided. Carriage 53, while composed of a plastic, supports metal bushes 68 which allow carriage 53 to be slideably and rotatably mounted on guide shaft 51. An important requirement and feature of a magnetic recording device is its ability to securely access a track position upon receiving an instruction to read/write from or onto the medium. To ensure the positional accuracy of carriage 53 it is essential to maintain the hardness of carriage 53 and to prevent the attrition of the slideable portion, namely metal bushes 68 and guide shaft 51 of the feed mechanism. Carriage 53 may be made of plastic and includes glass or the like, thereby ensuring the hardness thereof. Similarly, metal bush 68 is disposed in the slideable portion of the mechanism thereby preventing the attrition of guide shaft 51 due in part to the surface deposition of the glass or the like on the shaft, as well as the attrition of the carriage 53.

This prior art mechanism, as discussed above, suffers from the disadvantages of overrotation of the pinion, the tensile phenomenon and magnetism sensitivity. Another disadvantage is that due to the need of surplus structure to prevent deterioration and attrition, the pieces of the magnetic recording device are not interchangeable. As a result, mass production of the magnetic recording device according to the conventional rack and pinion magnetic head feeding device has yet to be accomplished.

Accordingly, it is desirable to provide a magnetic head feeding mechanism for a magnetic recording device of simple design to increase position accuracy while enabling mass production of a magnetic recording device having a rack and pinion magnetic head feeding device. By simplifying the magnetic recording device mass production can easily be achieved while providing an improved magnetic memory device having high reliability at a low cost.

SUMMARY OF THE INVENTION

Generally speaking, in accordance with the invention, a magnetic head feeding mechanism having an improved magnetic head feeding apparatus is provided. The magnetic head feeding apparatus includes a guide mounted on a frame. The carriage is mounted on the guide. A magnetic head is mounted on the carriage which is slideably and rotatably mounted on the guide. A rack is mounted on the carriage so as to extend parallel to the guide direction. A pinion is provided on a rotating output shaft of a rotating drive means mounted on a frame and engages the rack. The carriage, and therefore the magnetic head, is reciprocally moved along the guide by rotation of the pinion.

The rack is biased towards the pinion without being contacted by any external structure. An engagement displacement inhibitor controls displacement of the rack from the pinion and prevents deviation in the engagement position-phase relationship. A wall integrally formed with the rack limits over rotation of the pinion as well as controlling the movement of the carriage.

It is an object of this invention to provide an improved magnetic head feeding device.

Another object of this invention is to simplify the construction of a magnetic head feeding device for mass production.

A further object of this invention is to provide an engagement bias between the rack and pinion of a magnetic print head free of resonance due to vibration and shock, allowing for the maintance of a stable biasing force during operation.

Still another object of this invention is to reduce variation of the engagement of the excitation signal phase-rack and pinion position relationship by controlling the engaging displacement of the rack and pinion.

Yet another object of this invention is to prevent over rotation of the pinion through use of a stopper means.

A further object of this invention is to better control movement of the carriage through the use of a stopper means.

Still other objects and advantages of the invention will in part be obvious and will in part be apparent from the specification and drawings.

The invention accordingly comprises features of construction, combinations of elements, and arrangements of parts which will be exemplified in the constructions hereinafter set forth and the scope of the invention will be indicated in the claims.

BRIEF DESCRIPTION OF THE DRAWINGS

For fuller understanding of the invention, reference is had to the following description taken in connection with the accompanying drawings, in which.

DETAILED DESCRIPTION OF THE PREFERRED EMBODIMENTS

Figure 7:
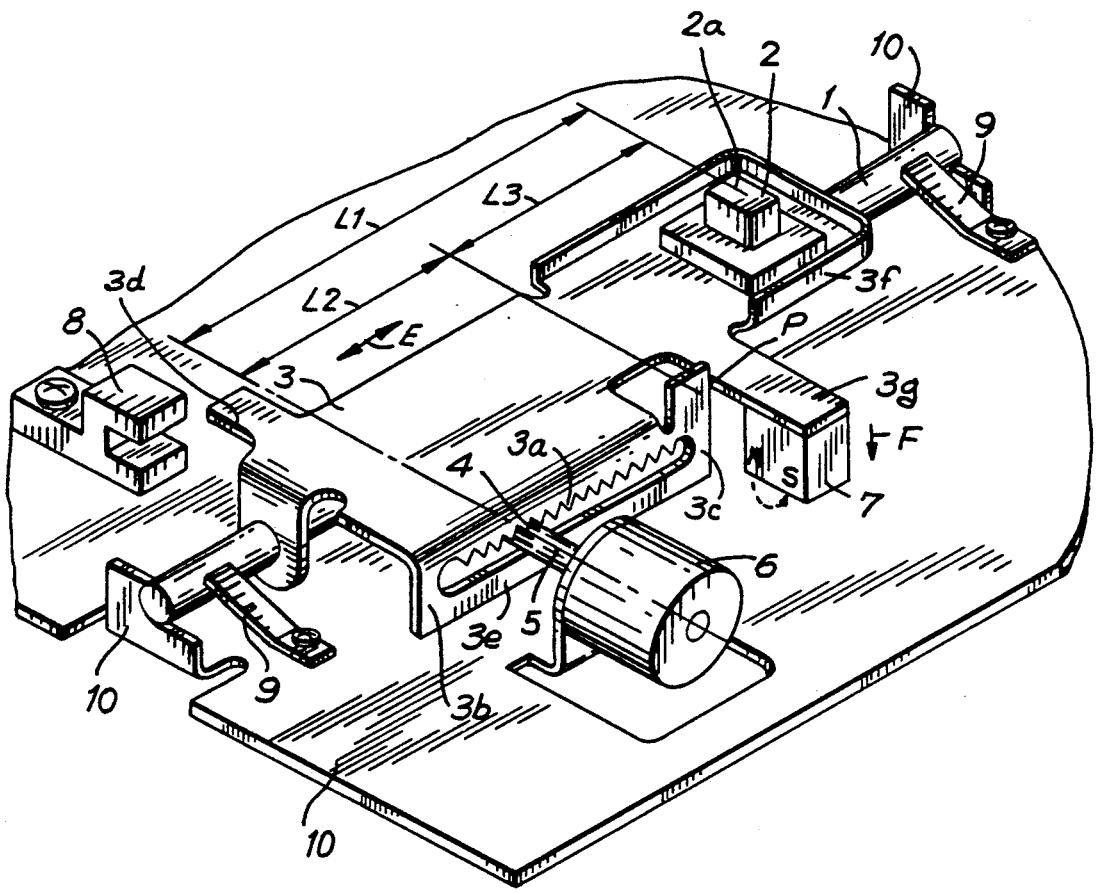
FIG. 7 is a perspective view of a magnetic head feeding device constructed in accordance with the present invention.

Reference is first made to FIG. 7, wherein a perspective view of a magnetic head feeding device constructed in accordance with the invention is shown. A guide shaft 1 is affixed to a frame 10 by elastic press plates 9. A carriage 3 is integrally formed with a rack 3a and is slideably and rotatably mounted on guide shaft 1. A magnetic head 2 is mounted on carriage 3 at a predetermined position.

A step motor 6 is provided on frame 10 and includes a rotating output shaft 5 extending therefrom. A pinion 4 is mounted at the end of shaft 5. Pinion 4 engages rack 3a and step motor 6 provides a reciprocating rotating drive to pinion 4. Step motor 6 is mounted on the frame 10 so that its rotation is prevented by a screw or the like. The outer portion of step motor 6 and rotating output shaft 5 are formed concentrically.

A magnetic circuit for biasing rack 3a to engage pinion 4 is formed by a magnet 7, supported on a projecting portion 3g of carriage 3, and frame 10 itself which is made of a magnetic material which is attracted by magnet 7. Projecting portion 3g of carriage 3 projects in a direction extending parallel to output shaft 5 away from guide shaft 1. Magnet 7 is thus positioned a greater distance from guide shaft 1 than rack 3a to provide the desired biasing force. Magnet 7 is displaced parallel to but spaced from frame 10 as carriage 3 moves, keeping magnetic contact with frame 10, thereby providing an engagement force in the direction of arrow F while controlling the sliding and rotation of carriage 3. Step motor 6 drives carriage 3 through pinion 4 due to the engaging force provided by magnet 7 without frictional or other contact losses.

As a result, when step motor 6 is driven, carriage 3 moves in the direction of arrow E along guide shaft 1 and the engagement of rack 3a and pinion 4 does not become displaced. It is step motor 6 which provides the rotating force for moving carriage 3.

Carriage 3 which is slideably guided along guide shaft 1, includes curved walls 3b and 3c at either end of rack 3a which act as stops and control the rotation of pinion 4 as well as the range of movement of carriage 3. This occurs due to the fact that eventually pinion 4 abuts against either wall 3b or wall 3a during reciprocal displacement thereof. In other words, the movement range of carriage 3 in the direction of arrow E is defined by walls 3b and 3c. Accordingly, the phase-position relationship between the absolute position of carriage 3 and the excitment phase of step motor 6 as defined by the engagement positioning relationship between rack 3a and pinion 4 has a fixed regularity. A transmitting photosensor 8 detects the position of carriage 3 and determines the initial reference setting. A light screen 3d extends from a portion of carriage 3 at a preset position. When light screen 3d passes through photosensor 8 a signal is generated, thereby setting the initial reference position.

Figure 9:
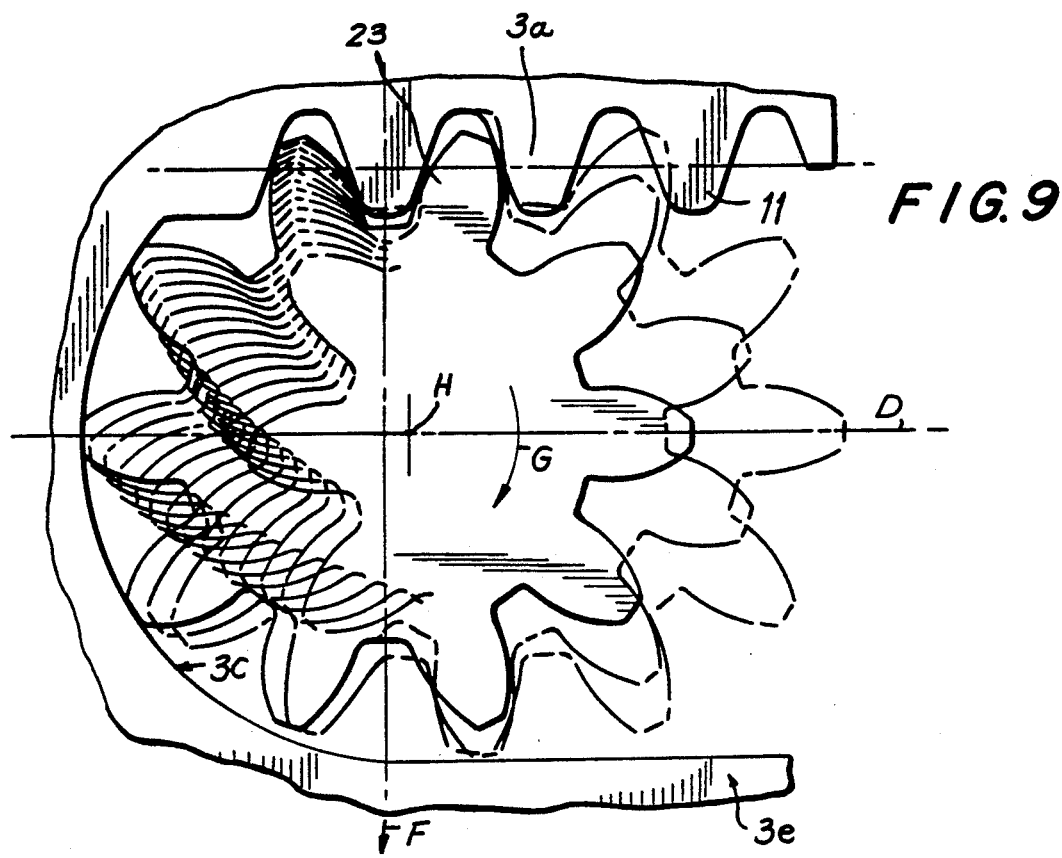
FIG. 9 is a front elevation view of a rack and pinion in accordance with the present invention at various positions of rotation showing the stopper means.
Figure 10:
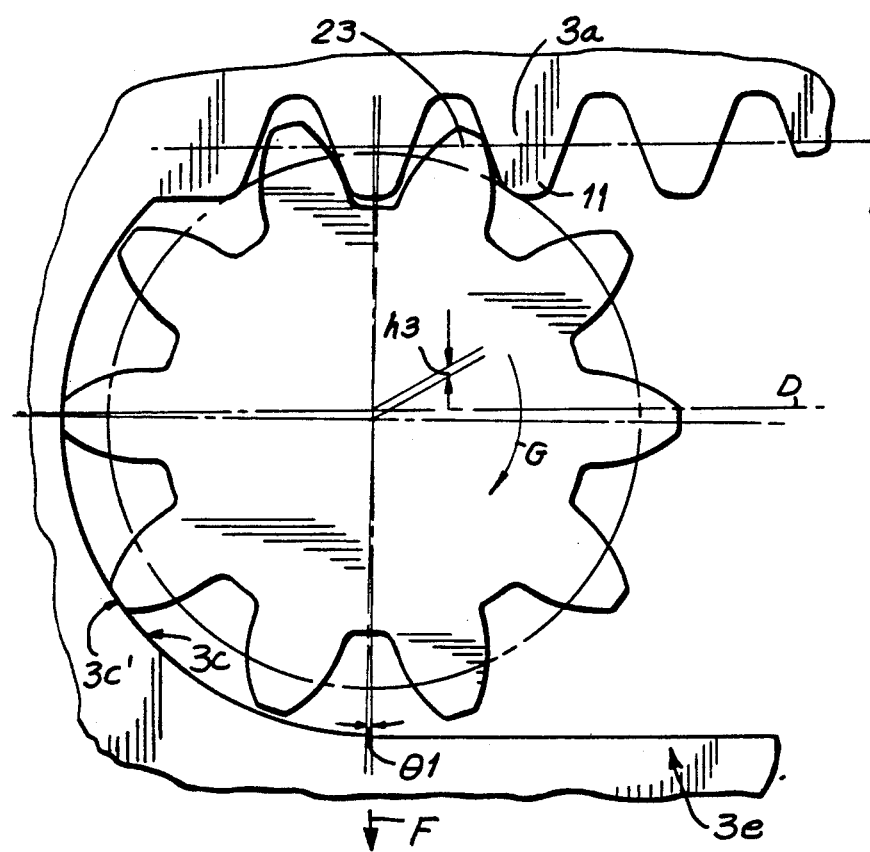
FIG. 10 is a front elevation view of a rack and pinion in accordance with the present invention at a position of over-rotation showing the stopper means.
Figure 11:
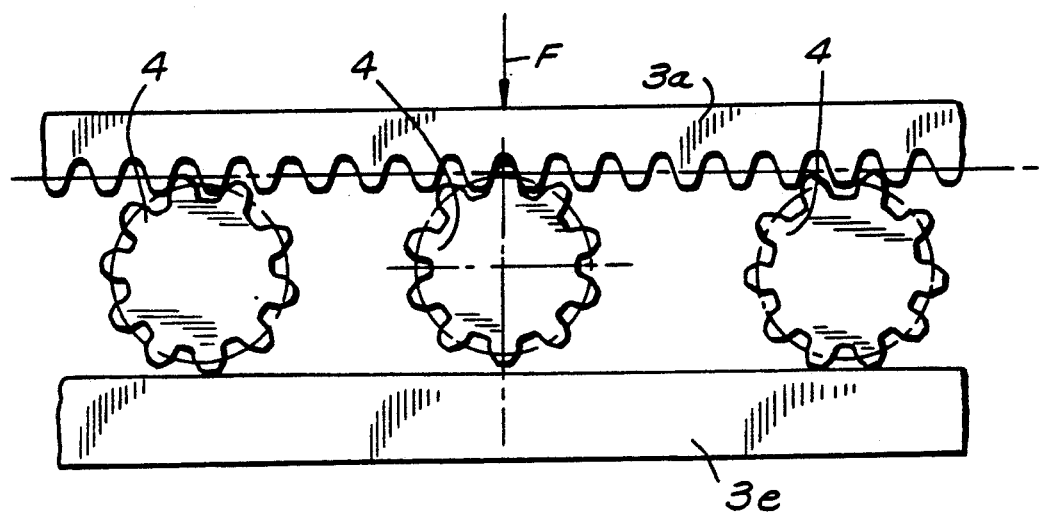
FIG. 11 is a front elevational view showing the pinion of the present invention in various stages of rotation in relation to the rack.

Reference is now made to FIGS. 9, 10 and 11 in which the interaction between pinion 4 and rack 3a is shown in greater detail. FIG. 11 depicts various conditions of pinion 4. The normal engagement condition of rack 3a and pinion 4 is shown in the center. As discussed above a magnetic circuit including magnet 7 and frame 10 rotatably biases slideable and rotatable carriage 3 about guide shaft 1, thereby imparting an engagement force in the direction of the arrow F. Therefore, rack 3a and pinion 4 are firmly engaged with each other without backlash. However, due to vibration and shock which often occurs during operation, carriage 3 attempts to move along guide shaft 1 even when pinion 4 is held in a stop position by the holding torque of step motor 6. When carriage 3 experiences vibration and shock in a direction opposed to the direction of arrow F, carriage 3 attempts to disengage. To overcome these tendencies the magnetic circuit provides a large biasing force in the direction of arrow F as well as an anchoring force in the direction opposed to the sliding of carriage 3. However as discussed above, as the force becomes larger, the friction loss of step motor 6 due to the biasing also becomes larger. Therefore, step motor 6 does not operate efficiently and extremely large amounts of power are required in order to drive motor 6.

To overcome the above problem, a contour wall 3e is provided opposed to rack 3a and formed integral with walls 3b, 3c and rack 3a. Contour wall 3e is spaced a predetermined distance from rack 3a and has a predetermined length. Pinion 4 extends and is retained between rack 3a and contour wall 3e. Since contour wall 3e is integral with walls 3b and 3c, which are integrally formed with rack 3a, pinion 4 when passing from one section of rack 3a to another is restrained and prevented from becoming disengaged from rack 3a irrespective of the vibration to which it may become subjected (see left and right pinions of FIG. 11). Accordingly, the jumping and resonance of the rack is no longer a problem. Disengagement may also be prevented by having rotating output shaft 5 come in contact with an offset contour wall 3e in a manner similar to that described above in connection with pinion 4.

Rack 3a must also be prevented from floating relative to pinion 4 in order to maintain the above-mentioned position-phase relationship. Floating is prevented by limiting the movement in the direction of arrow E of pinion 4. A stop adjacent to pinion 4 or rotating output shaft 5 prevents rack 3a, and therefore carriage 3, from floating relative to pinion 4. Reference is now made to FIG. 9 wherein the relative movement between pinion 4 and rack 3a during rotation of pinion 4 is shown. For explanation purposes, pinion 4 is considered to move relative to a fixed rack 3a. Pinion 4 moves planitarily along chain line D while rotating in the direction of arrow G. The steps of the movement of pinion 4 as pinion 4 moves towards curved wall 3c (or curved wall 3b) are shown by fine lines, while the position of pinion 4 in engagement with curved wall 3c (or curved wall 3b) is shown by a heavier line.

The rotation of pinion 4 moves rack 3a, thereby bringing pinion 4 adjacent to wall 3c (or wall 3b). Similarly, the movement of rack 3a will cause pinion 4 to rotate, again bringing pinion 4 adjacent to wall 3c (or wall 3b). In the position of pinion 4 shown by the darker line, it is required that the rotation of pinion 4 and movement of rack 3a be stopped. Although when stopping pinion 4 and rack 3a some over rotating of pinion 4 occurs, over rotation is controlled and kept to a minimum, extremely small amount, by the dimentional relationship of curved side walls 3c, rack 3a and contour wall 3b.

Reference is now also made to FIG. 10 in which pinion 4 is shown in the stopped position. A chain line D shows the center position of pinion 4 when pinion 4 engages rack 3a in the stopped position. For simplicity of explanation, only curved side wall 3c is discussed, however stopping pinion 4 at the other curved side wall 3b is accomplished in a similar manner. Wall 3c is constructed in the shape of an arc having a diameter slightly larger than the diameter of pinion 4, the center of the arc of wall 3c being at point H which is a point just off center of pinion 4 at the stopped position. The diameter (FIG. 9) of the curvature of curved wall 3c is close to the outer diameter of the teeth 23 of pinion 4, but wall 3c does not restrain or fix pinion 4. While the ends of teeth 23 can and will engage wall 3c, such engagement does not tend to displace rack 3a in the direction opposite to arrow F, which would lead to the undesired conditions of the prior art devices. Rather, as discussed below, such engagement tends to either restrain such motion or even to apply pressure in the direction of arrow F. Due to its simple design, wall 3c, is easily manufactured thereby making mass production more feasible.

When pinion 4 is rotated in the direction of arrow G, pinion 4 causes rack 3a to move causing wall 3c to abut pinion 4. Since wall 3c is integrally formed with rack 3a it acts as a support causing rack 3a and in turn carriage 3 to move a distance h3 against the engaging force provided in the direction of arrow F. Pinion 4 rotates in the direction of arrow G through an angle of $\theta 1$, until it becomes locked in place by rack 3a and the engagement of a tooth 23 with wall 3c at point 3c'. At this point rack 3a and carriage 3 are also prevented from further movement. However, this overrotation is stopped in less than one step of step motor 6.

The foregoing stop mechanism is available to stop the rotation of step motor 6 in the above manner when step motor 6 receives an error signal due to outside noise or the like and runs away. Furthermore, the stop mechanism also functions after pinion 4 does not instantaneously stop despite the stopping of carriage 3 by conventional means described above. Additionally, a slight damper effect results from the above stopping mechanism.

When it is the movement of rack 3a which makes pinion 4 rotate to bring pinion 4 adjacent to wall 3c, pinion 4 normally cannot immediately stop due to inertial forces. Therefore pinion 4 continues to rotate even upon abutting wall 3c (or wall 3b). Thus, pinion 4 imparts a rotating force to rack 3a, thereby making rack 3a, move a distance h3 against the engagement force in the direction of arrow F. Pinion 4 rotates in the direction of the arrow G through angle $\theta 1$. However, when pinion 4 engages wall 3c at point 3c', rotation of pinion 4 and the movement of carriage 3 stop due to pinion 4's engagement with rack 3a and wall 3c (or wall 3b).

As a matter of course, pinion 4 and the rack 3a are engaged with each other irregularly at the time of stopping. Contour wall 3e does not act to stop the movement of carriage 3 or the rotation of pinion 4, but acts to prevent the relative displacement of rack 3a and pinion 4 beyond a desired maximum amount, and therefore the errors in the phase-position relationship which arise from the prior art devices.

As noted, the structure of carriage 3 now controls the movement of carriage 3, while at the same time stopping the rotation of pinion 4 with a minimum of over rotation. Wall 3c acts to stop the rotation of pinion 4 as well as the movement of carriage 3.

Moreover, wall 3c (and wall 3b) is curved in shape and has a diameter centered at point H greater than the outer diameter of pinion 4. Teeth 11 of rack 3a and teeth 23 of pinion 4 are also formed with arc-shaped surfaces. Accordingly, even though pinion 4 is subjected to hard vibration and shock, it is possible to prevent pinion 4 from colliding with wall 3c at the edge of teeth 23 and prevent the rack 3a from colliding with pinion 4 at the edge of teeth 11. These arc-shaped surfaces prevent pinion 4 and rack 3a from being subjected to damage due to hard shock. Furthermore, when the surfaces of teeth 23 and teeth 11 are formed with the same arc-shaped contour, by buffing or the like, it prevents damage even more.

Accordingly, the present invention due to the function and the structure of the stop for controlling both the movement of carriage 3 and the rotation of pinion 4 provides a benefit over the prior art magnetic head feeding device. The above stopping structure has assumed that rack 3a, wall 3c (and wall 3b) and contour wall 3e are all in the same plane. However, the magnetic head feeding device will control the rotation of pinion 4 and movement of carriage 3 if rack 3a, side walls 3c and 3b and contour wall 3e are formed on different planes. Thus, while rack 3a must be in registration with pinion 4, side walls 3b and 3c can be in registration with the pinion 4 and contour wall 3e in registration with output shaft 5, and vice-versa.

In the prior art magnetic recording device, the read/write track position of the medium must be standardized. During construction of applicant's invention, it is required that the position of the walls 3c and 3b and the mounting position of magnetic head 2 on carriage 3 be arranged in a predetermined relationship with respect to the position of the print medium because the stop position sets magnetic head 2 at the read/write track position allowing access to the print medium. Magnetic head 2 is positioned by reference to positions measured from the center or rotation axis of the medium. To determine the predetermined position of magnetic head 2, carriage 3 is moved to a predetermined position in accordance with the driving of step motor 6. The position of magnetic head 2 is determined by the rotation of step motor 6. This results from the fact that the distance L1 between step motor 6 and a read/write gap 2a of the magnetic head 2 is controlled.

When the distance L1 and the location of the stopper means are properly controlled and positioned, a movement region of magnetic head 2 is defined where magnetic head 2 accesses a desired portion of the read/write track as mentioned above. However, a very complex structure is required for accurately determining and setting the positional relationship of the relative engagement phase of teeth 23 of pinion 4 and rack 3a. The present invention provides the means for determining and setting the positional relationship of the engagement phase simply and accurately, and the means for moving the magnetic head 2 to the desired position.

An embodiment of the present invention for determining the desired positioning relationship of the position of magnetic head 2 and the track position is explained below. Wall 3c, wall 3b, and rack 3a are integrally formed on carriage 3. As discussed above the relationship between the shape of gear teeth 11 of rack 3a, wall 3c and wall 3b helps control the movement of carriage 3 relative to pinion 4 and therefore aids in determining the positioning relationship with high accuracy. Furthermore, a reference point P (FIG. 7), which is set at a predetermined position relative to wall 3b, wall 3c and rack 3a, is provided for determining the engagement phase of rack 3a and pinion 4.

In accordance with the above structure, three adjustable position determining structures are provided.

In a first embodiment a variable distance L2 defined as the distance between step motor 6 and the reference point P is determined. Pinion 4 is rotated moving carriage 3 in the direction of arrow E thereby setting the reference point P at a desired position. Thus, as a result of changing distance L2, the positional relationship of the relative engagement phase of gear teeth 11 of rack 3a and gear 23 of pinion 4, and the relative positioning relationship between that relative engagement phase of rack 3a and pinion 4 and the stopper means defined by wall 3c and wall 3b are accurately determined and set, thereby making it possible to control the above relationships. Since magnetic head 2 is mounted on carriage 3, the distance between reference point P and the read/write gap 2a of the magnetic head 2 is a fixed distance L3 which satisfies the condition $L1=L2+L3$. Accordingly, motor 6 causes carriage 3 to move, thereby allowing magnetic head 2 to access the desired read/write track position, and thereby providing a movement control region for carriage 3.

As discussed above step motor 6 steps through a predetermined angle to rotate pinion 4 which moves carriage 3. Accordingly, it is necessary to set the phase-position relationship of the relative phase of the step phase of step motor 6, namely, the magnetic phase of the rotor of step motor 6, and the position of gear teeth 23 of pinion 4 in a known desired relationship. To accomplish this the magnetizing of the rotor of step motor 6 is done after accurately determining and setting the positional relationship of the engagement of gear teeth 11 of rack 3a and gear teeth 23 of pinion 4, and the relative positioning relationship between the above engagement position and wall 3c (and wall 3b).

To determine and set the engagement position relationship between gear teeth 11 and pinion 4, and the positional relationship between this engagement position and wall 3c or 3b, pinion 4 may be rotated to the position at which either wall 3c or wall 3b moves adjacent to pinion 4 by moving carriage 3 in either of the directions of arrow E. Moreover, once this relationship is known there is no need to readjust the read/write track position of the medium and relative position of magnetic head 2. The position of stepping motor 6 can be determined solely by the mounting structure thereof. Accordingly, the simple construction lends itself to automated mass production of the magnetic recording devices.

Furthermore, the present structure determines and controls, in a simple manner, the relative positioning relationship between the read/write track position of the medium and the relative position of the magnetic head, thereby preventing positioning deviations of the rotating driver, step motor 6. In other words, the relative positioning relationship between magnetic head 2 and the read/write track position of the medium is firmly secured. Therefore, the reliability of the magnetic recording device is extremely high.

In a second position determining structure, the distance L2 is again set as the distance between step motor 6 and reference point P. The outer portion of step motor 6 is rotated moving carriage 3, thereby setting the reference point P at a desired position. Thus, as a result of changing the distance L2, it is possible to accurately determine and control the relative engagement phase positioning relationship between gear teeth 11 of rack 3a and gear teeth 3 of pinion 4, and the relative positioning relationship between this engagement phase position and wall 3c (and wall 3b).

Magnetic head 2 is mounted on carriage 3. Read/write gap 2a of magnetic head 2 is a distance L3 from reference point 3 and is a function of L1 and L2 so that L1=L2+L3. As discussed above carriage 3 is moved by step motor 6, thereby magnetic head 2 becomes positioned at a desired read/write track position of the medium, and further thereby provides a movement control region for carriage 3.

Again, as discussed above, step motor 6 steps through a predetermined angle to rotate pinion 4. Moving carriage 3 by rotating the outer portion of the step motor 6 results in adjusting the phase positioning relationship between the stepping phase of step motor 6, namely the magnetic phase of the motor, and the gear teeth of rack 3a to the desired relationship. There is no need to additionally define the relative phase positioning relationship between gear teeth 23 of pinion 4 and the magnetic phase of the rotor.

However, to accurately determine and set the relative engagement position relationship between gear teeth 11 of rack 3a and teeth 23 of pinion 4, and the relative positioning relationship between the above engagement position and the stop position, carriage 3 can be moved by rotating the outer portion of step motor 6 until either wall 3c or wall 3b is adjacent to pinion 4. Moreover, there is no longer a need to readjust the read/write track position of the medium relative to the position of magnetic head 2. However, if it is necessary to adjust the position, the rotation of motor 6 makes it possible to control the microadjustment of the position of magnetic head 2. Therefore, the present structure lends itself to mass production of magnetic recording devices.

In a third position adjusting structure, the distance L2 is again set as a determined distance between step motor 6 and reference point P. The position of step motor 6 is moved to a predetermined position in the direction of arrow E to define distance L2. Furthermore, carriage 3 is immobile relative to motor 6 in the direction of arrow E during this positioning of step motor 6. Thus, as a result of changing distance L2, the relative engagement position relationship between gear teeth 11 of rack 3a and gear teeth 23 of pinion 4, and the relative positioning relationship between the above engagement position and the stop position are accurately determined, thereby also aiding in controlling the above relationships. Magnetic head 2 is mounted on carriage 3 so that read/write gap 2a is a distance L3, from reference point P and L3 is related to L1 and L2 such that L1=L2+L3 Step motor 6 drives carriage 3 thereby positioning magnetic head 2 to have access to the desired read/write track position of the medium and defining a movement control region for carriage 3. The means for mounting motor 6 so as to be movable in the direction of arrow E, for positioning, while not shown in FIG. 7, may be of any conventional design.

In the above structure, the relative phase-positioning relationship between the magnetic phase of the rotor and gear teeth 23 of pinion 4 is the same as in the first position adjusting structure discussed above. Again, there is no need to readjust the relative position between the read/write track position of the medium and magnetic head 2. However, if it is necessary to adjust the position slightly, microadjustment of the position is accomplished through movement of step motor 6. Accordingly, this structure also lends itself to automated mass production of the magnetic recording device. Furthermore, the combination of this structure and the structure of rotating motor 6 of the second positioning structure provide a simple microadjustment control for adjusting the positioning of magnetic head 2.

All three of the above positioning adjustment structures of magnetic head 2 make it possible to accurately control the relative engagement positioning relationship between gear teeth 11 of rack 3a and pinion 4. Accordingly, the above controls make it possible to adjust for the relative attrition in positioning which results from the engagement of gear teeth 11 and pinion 4 over time. The above structures for adjusting the position of magnetic head 2 include wall 3c and wall 3b as stops. However, walls 3b, 3c are not necessary for the position control.

The position adjustment of magnetic head 2 as described provides advantageous features over the general magnetic head feeding device of the magnetic recording devices which use the lead screw driving method and the steel belt driving method. These two methods provide all of the functions of feed positioning accuracy through the driving motor. On the other hand, the present invention provides a magnetic head feeding device composed of rack 3a and pinion 4, wherein although pinion 4 performs a few of the feed positioning accuracy functions, the major part of this function is performed by rack 3a. Simultaneously, rack 3a ensures feed positioning accuracy by its shape. It is therefore possible to provide position adjustment for controlling the position of gear teeth 11 of rack 3a directly without providing the above reference point P. Accordingly, the present invention lends itself to automated mass production.

One of the most important features of the magnetic recording device is its ability to access the read/write position (hereinafter referred to as the track position) securely upon receiving a read/write command. To accomplish this, one must know the phase-position relationship between the absolute position of carriage 3 and the excitement phase of step motor 6, namely, the reference initial setting of the track position.

Figure 8:
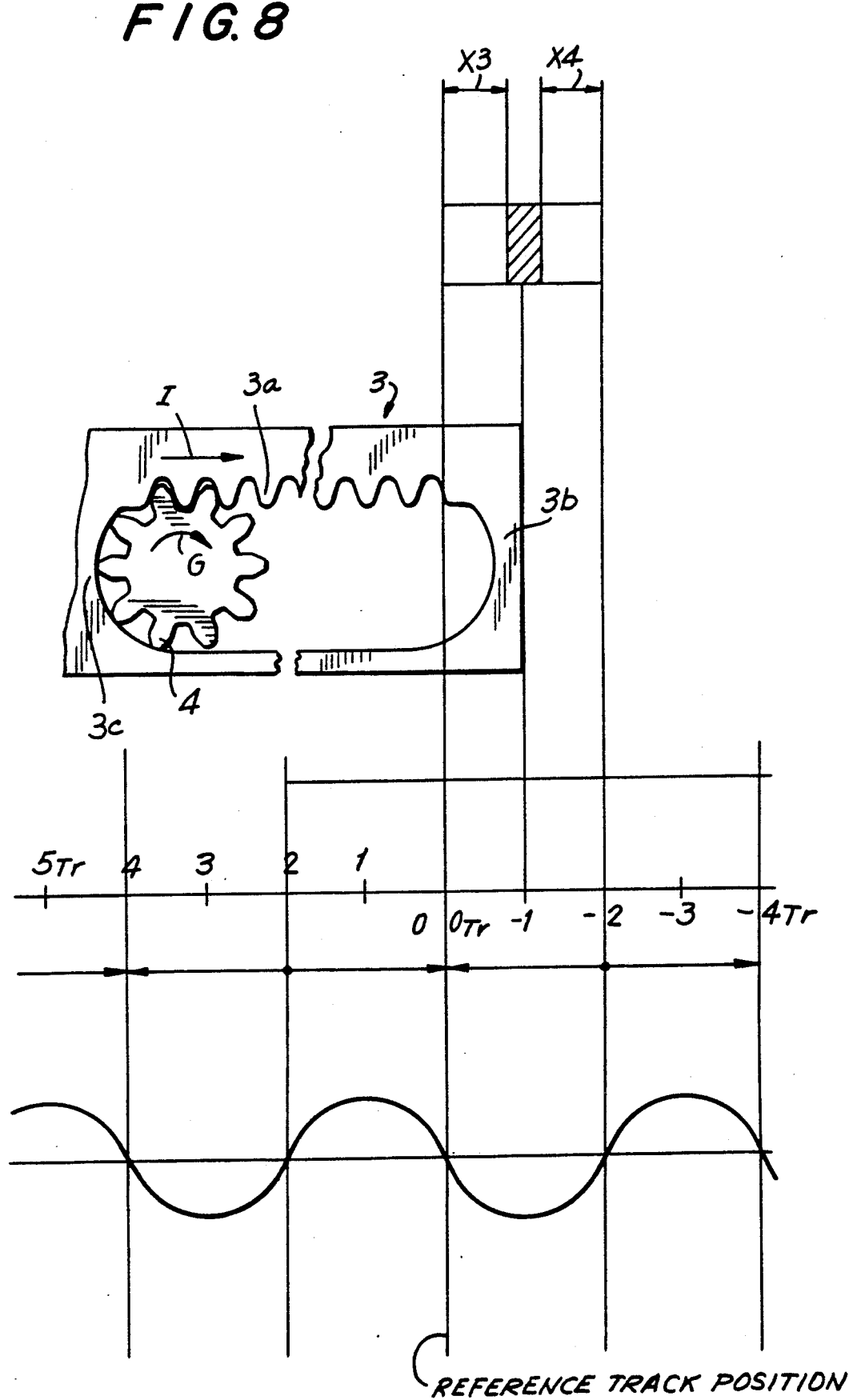
FIG. 8 is a schematic and graphic representation of the control of the magnetic head feeding device of FIG. 7 in accordance with the present invention.

Reference is now also made to FIG. 8 wherein the control of the movement of carriage 3 is depicted. In descending order, FIG. 8 depicts the control region of movement of the carriage, the carriage stopper, the detecting signal of track position, track position, the rotation direction of the step motor and the torque curve of the step motor. In FIG. 8, the phase-position relationship between the absolute position of carriage 3 and the excitement phase of step motor 6 is an abscissa axis. The reference track position is 00Tr, the most outer peripheral track position. The positive integer multiplies of Tr are within the periphery and the negative integer multiples of Tr are outside of the periphery. Track position is standardized so as to count by nTr to the inner periphery from the 00Tr position. In a four phase stepping motor (1Tr/1 step), when the step motor is excited to the excitment phase at 00Tr, the step motor is represented as a continuous torque curve which corresponds to the track position as shown in FIG. 8. The step motor rotates to the track positions corresponding to −4Tr, 00Tr, . . . , (n·4)Tr. These positions have the same excitement phase at the same time. To which position the step motor will rotate depends upon the state of the phase position before excitement. Namely, when the state of the phase position before the excitement is between 2Tr to2Tr, the stepping motor rotates toward 00Tr.

To compare the relative positioning relationship of the phase position of the excitement phase with the absolute position of carriage 3, so that the phase position of the excitement phase and the absolute position of carriage 3 are properly related at the reference track position of carriage 3, namely 00Tr, the track position detecting signal which is output from the transmissive photosensor 8 and the phase position of the excitement phase are combined.

Moreover, carriage 3 is moved in the direction of arrow I (FIG. 8) from the inner pheripheral side, thereby setting the position of carriage 3 to the reference track position, namely, 00Tr, and making the track position detecting signal a reference position. To prevent movement of carriage 3 beyond the −2Tr position, wall 3c, prevents pinion 4 from moving carriage 3 beyond that point. In other words, wall 3c controls the movement region of carriage 3 in the direction of arrow E. The absolute position of carriage 3, namely the position of carriage 3 when the phase-positioning relationship between rack 3a and the excitement phase of step motor 6 is that shown schematically in FIG. 8. Carriage 3 is prevented from moving to the outer pheriphery side by a distance exceeding −2Tr.

When carriage 3 has traversed the predetermined track positions, the inner peripheral side wall 3b abuts pinion 4 preventing movement of carriage 3 in a manner similar to wall 3c. Wall 3b controls the rotation of pinion 4, and therefore controls the movement region of carriage 3 as well as the movement of rack 3a. Since the position in the region of side wall 3b is not critical or delicate, the following discussion will focus on wall 3c.

When carriage 3 is positioned within 2Tr, the track position detecting signal has not occurred and pinion 4 rotates in the direction of arrow G. When carriage 3 moves to the outer pheripheral side in the direction of arrow I, the track position detecting signal coincides with the predetermined phase position of the excitement phase of step motor 6, and the coincidence position becomes the reference track position of carriage 3, namely, 00Tr. The above structure allows for easy confirmation of the reference track position when step motor 6 malfunctions due to outside noise which may cause motor 6 to miss the phase position of the excitement phase, for example, just after powering the magnetic recording device.

Similarly when carriage 3 is located at a position where the track position detecting signal occurs, namely, between 2Tr and −2Tr then the track position detecting signal will cause the driving signal to the stop motor to correspond to the phase position of the already known excitement phase of step motor 6. So, the above position becomes the reference track position of the carriage 3, namely, 00Tr. Again the above structure is extremely applicable just after powering the magnetic recording device and when confirmation of the reference track position is necessary.

Wall 3c which acts as the stop for carriage 3 as mentioned above is not used in prior art magnetic recording devices. However, as mentioned above, wall 3c provides many advantages. For example, when carriage 3 imparts a rotating force to step motor 6 subjecting motor 6 to hard shock or the like, thereby moving against the holding torque of motor 6, wall 3c when adjacent to pinion 4 controls the movement of pinion 4 at a time when step motor 6 normally malfunctions, causing motor 6 to run out and miss the phase postition of the excitement phase.

Carriage 3 moves toward 00Tr from the inner pheripheral side. At this time, carriage 3 overshoots its stop point due to the inertia of the rotor of step motor 6. An overshoot portion from which X3 and X4 are extracted, namely, the region which is marked with the diagonally hatched lines in FIG. 8, is the position region for controlling the movement of carriage 3 by abutting wall 3c with rotating output shaft 5 or pinion 4. X3 is the surplus space between pinion 4 and adjacent wall 3c and X4 is the surplus space from being able to move to 00Tr even though the dead zone is deducted from the torque curve of step motor 6. Surplus space X3 and surplus space X4, are provided with enough positioning accuracy relative to wall 3c to ensure that the positioning requirements are met.

The positioning of wall 3c as a stop for carriage 3 provides two features. First, magnetic head 2 is provided on carriage 3, so that the relative positioning relationship between the absolute position of carriage 3 which is mounted at the desired position as mentioned above and the phase position of the fixed excitement phase of step motor 6 coincide with each other. Then, the output position of the track position detecting signal generated from transmitting photosensor 8 is adjusted. This position is compared with the phase position of the predetermined excitement phase, thereby allowing adjustment of the position which satisfies the above mentioned two conditions which determine the reference track position of carriage 3, namely, 00Tr. Secondly, after the above initial adjustments are completed the position of wall 3c which is integrally formed with carriage 3 is determined, therefore, since wall 3c acts as the stop it is not necessary to readjust the position.

Furthermore after the above adjustments wall 3c performs the stop operation as shown in FIGS. 9 and 10. Wall 3c abuts rotating output shaft 5 or pinion 4, thereby controlling the movement of rack 3a, while simultaneously, providing a stop means for controlling the rotation of rotating output shaft 5 including pinion 4, which controls the movement of carriage 3.

Overrotation of pinion 4 through angle $\theta 1$ during the stop state still occurs during movement of the magnetic recording device. However, in the instant method of stopping using wall 3c to abut pinion 4 only a small amount of overrotation occurs.

In the prior art device when spring 58 and roller 57, which impart the engagement force between rack 55 and pinion 54 are subjected to vibration and resonance, the biasing force is often impaired due to the jumping which is generated by the weight possessed by the structure and the resonance of spring 58. To prevent the above jumping and the vibration the biasing force of spring 58 was increased. However, the more the biasing force was increased the greater the friction loss due to the increased forces acting on motor 56, thereby harming the properties of step motor 56. As a result step motor 56 consumes greater amounts of electricity to overcome this loss.

A magnetic circuit formed of magnet 7 mounted on portion 3g of carrige 3, and frame 10 which is made of a material which is attracted to magnet 7, acts to provide a force in the direction of arrow F which engages rack 3a and pinion 4 as well as securing the position of carriage 3. The magnetic circuit applies the force without contacting rack 3a or pinion 4, furthermore no spring is used, thereby removing the problem of resonance involved when keeping rack 3a engaged with pinion 4.

As mentioned above, the present invention does not suffer from the defects of the prior art devices. Step motor 6 does not excite the excitement phase at the reference track position, 00Tr, by exceeding the proper phase position of the excitement phase, −2Tr, due to slight overrotation of pinion 4, and therefore does not rotate step motor 6 in the direction of −4Tr. Furthermore, wall 3c moves to abut rotating output shaft 5 or pinion 4, thereby controlling the movement of carriage 3. As a result the "tensile phenomenon" does not occur due to the tendency of pinion 4 and carriage 3 to displace each other. Moreover, the present invention prevents the displacement and the deviation of the engagement of rack 3a and pinion 4 as contour wall 3e controls the displacement of rack 3a from pinion 4 by abutting pinion 4 from a direction opposed to rack 3a thereby preventing jumping by rack 3a which prevents deviation in the engagement position. Furthermore because of the presence of wall 3e, the engagement force of magnet 7 need not be overly increased.

Figure 12:
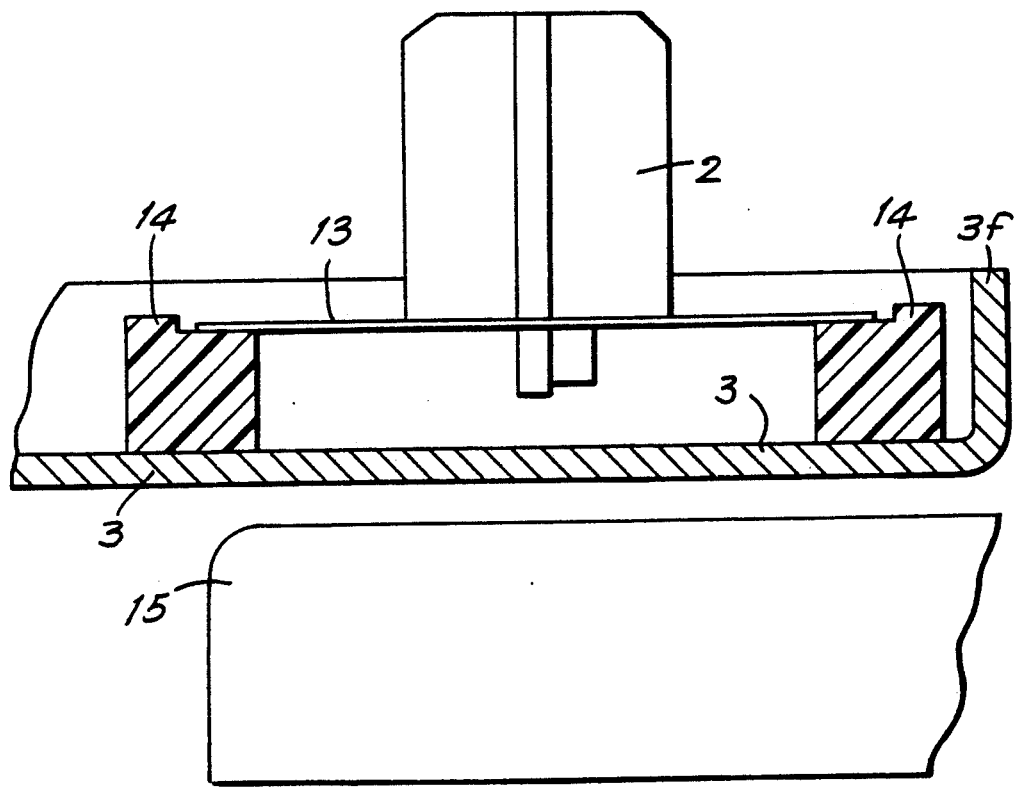
FIG. 12 is a sectional view of the magnetic head mounted on the magnetic head feeding device in accordance with the invention.

Reference is now made to FIG. 12 wherein a sectional view of the magnetic head support is shown. The carriage 3 is composed of a metal having magnetic properties, such as carbon steel, for example. A spacer 14 mounted on carriage 3 supports a gimbal 13. Spacer 14 and gimbal 13 are made of plastic or the like. Magnetic head 2 is mounted on gimbal 13. However, as mentioned in discussing the prior art, the conventional magnetic recording device suffers from magnetic leaks from the motor. Magnetic head 2 is extremely sensitive and reacts to even slight magnetic influences, thereby affecting the performance of magnetic head 2. A motor 15 is provided extremely close to magnetic head 2. Accordingly, magnetic head 2 will react to even tiny magnetic leaks, thereby making it impossible to exhibit the natural properties sought. However, according to the magnetic head mounting structure of the magnetic head feeding device of the present invention, carriage 3 which is composed of metal which is attracted to a magnet forms a mounting surface for magnetic head 2 as well as a surrounding wall 3f so as to enclose magnetic head 2.

The mounting surface of carriage 3 shields magnetic head 2 from the low magnetic leakage of the motor 15. Wall 3f shields magnetic head 2 from magnetic leakage from the side direction. Accordingly, due to the structure of carrige 3 there is no longer a need to provide a special magnetic head shield member for shielding around magnetic head 2. In the present invention carriage 3 is entirely composed of, carbon steel plate or the like, however, the carriage structure for shielding can also function even when carriage 3 is only partially made of carbon steel plate or the like.

Figure 16:
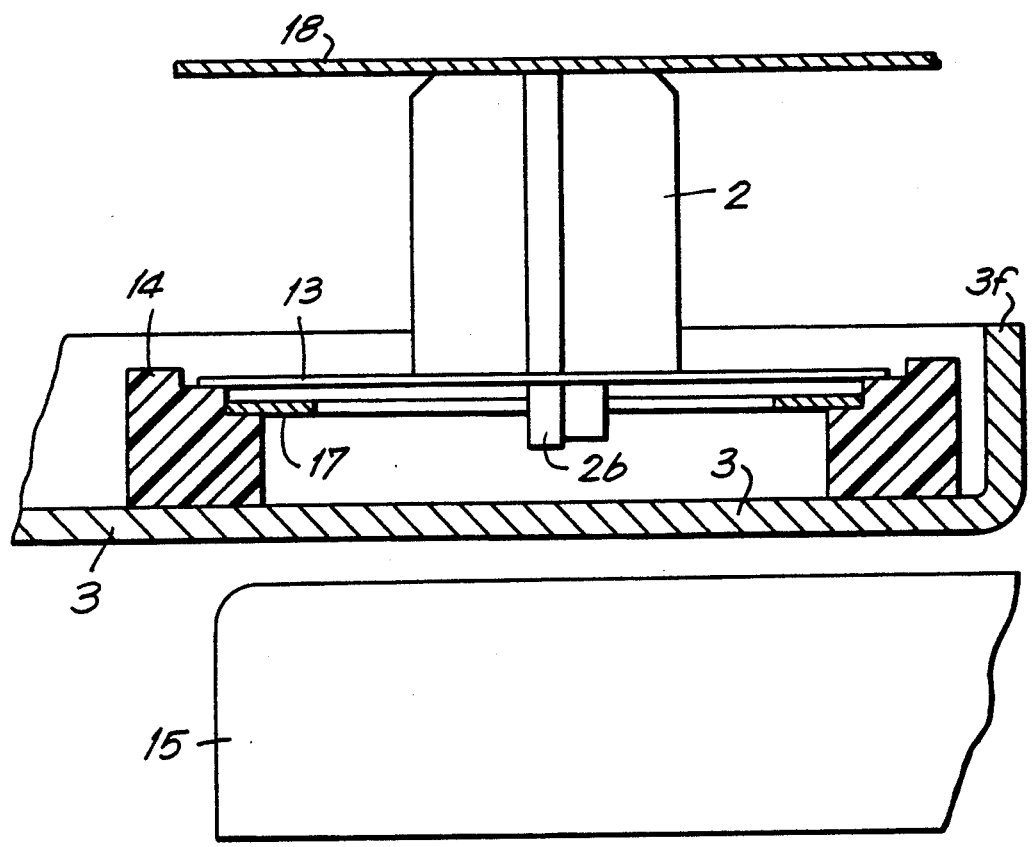
FIG. 16 is a sectional view of the magnetic head mounted on a magnetic head feeding device in accordance with an alternative embodiment of the invention.

Reference is now made to FIG. 16 wherein a sectional view of an alternative shielding structure is provided. The alternative embodiment is the same as the embodiment of FIG. 12 except that a shield member 17 is provided for additional shielding of magnetic head 2. Spacer 14 is mounted on carriage 3 and supports gimbal 13 upon which magnetic head 2 is mounted. Spacer 14 also supports shield member 17 which is composed of a permaloy member at a height which encloses a head core 2b of magnetic head 2. Shield member 17 extends in the same directions as gimbal 13, and medium 18. The shielding effect of member 17 varies with the size of shield member 17. The larger member 17 is made the more magnetism will be shielded. According to the magnetic head mounting structure of the present invention, due to the simple shielding structure it is easy to construct a large shield member 17. Accordingly, shielding is accomplished by a shield member having a simple flat shape.

Due to its positioning about head core 2b of the magnetic head 2, shield member 17 absorbs and shuts out the magnetic noise from the side direction and the planer direction of magnetic head 2. Member 17 may be mounted on spacer 14 with two sided adhesive tape or by a similar simple adhesive means, thereby providing an improved simple manner for shielding magnetic head 2. Shield member 17 may also be integrally formed with spacer 14, at a position close to gimbal 13. Additionally, the same shielding effect may be obtained by laminating shield member 17 on either the top or bottom of gimbal 13. Additionally, member 17 will provide additional shielding even though carriage 3 is not made of metal and without surrounding wall 3f.

Figure 13:
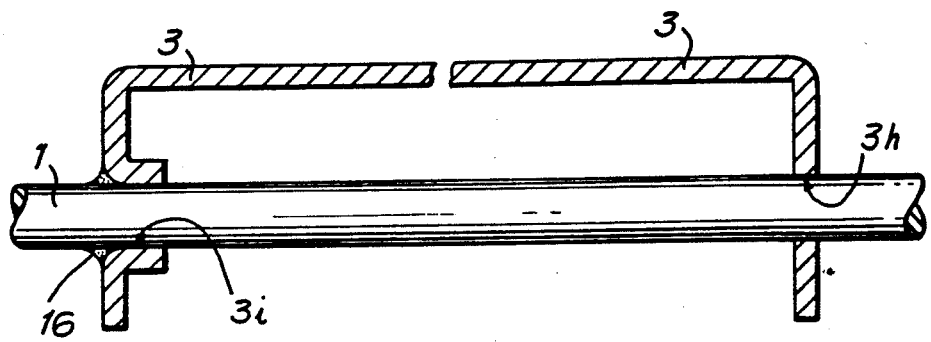
FIG. 13 is a partial sectional view of the coupling of the carriage and drive shaft of the magnetic head feeding device in accordance with the present invention.

Reference is now made to FIG. 13 wherein a partial sectional view of carriage 3 of FIG. 7 is provided. For ease of explanation carriage 3 is divided into two parts, the right part being different than the left part. Carriage 3 is made of metal such as carbon steel plate or the like. In the right hand side of FIG. 14, a guide aperture 3h, which is formed by press processing, extends through carriage 3. Guide shaft 1 extends through aperture 3h for guiding carriage 3 slideably and rotatably securing carriage 3 to guide shaft 1.

One of the important properties of the magnetic recording device is the ability to access the track position securely upon receipt of a read/write order. Driving motor 6, the position and the measuring accuracy of carriage 3 all contribute to the ability to access a track position accurately. Furthermore, a desired result is to maintain the hardness of carriage 3 and prevent the attrition of those parts which slide against each other. As mentioned above, carriage 3 is formed from carbon steel plate or the like ensuring sufficient hardness. As will be discussed below, there is no need to use bearings such as a metal bush, as in the prior art, to prevent attrition in those sliding parts. In the left hand side of FIG. 14, a guide aperture 3i, formed by press burring, extends through carriage 3. Guide shaft 1 extends through aperture 3i for guiding carriage 3 so that carriage 3 is slideably and rotatably mounted on shaft 1.

The processing of the surface of guide aperature 3i provides a surface so smooth that it is suitable for directly engaging with the guide shaft 1. As a result there is no need to use a bearing such as a metal bush. Further this construction is extremely conducive to use with a lubricant 16 at the shaft-aperature junction. As discussed above carriage 3 is made of a carbon steel plate. However, it must be realized that the sliding features of carriage 3 will function if only the slideable portion of carriage 3 is made of carbon steel.

Figure 14:
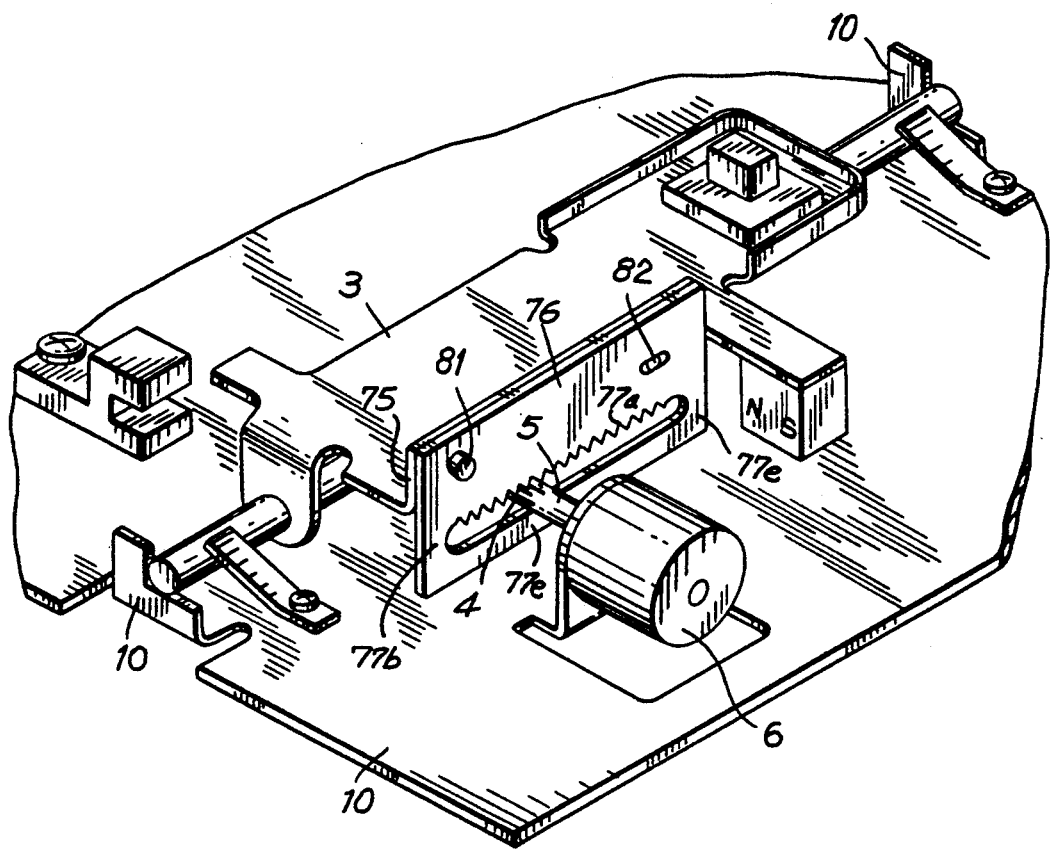
FIG. 14 is a perspective view of a magnetic head feeding device in accordance with an alternative embodiment of the invention.
Figure 15:
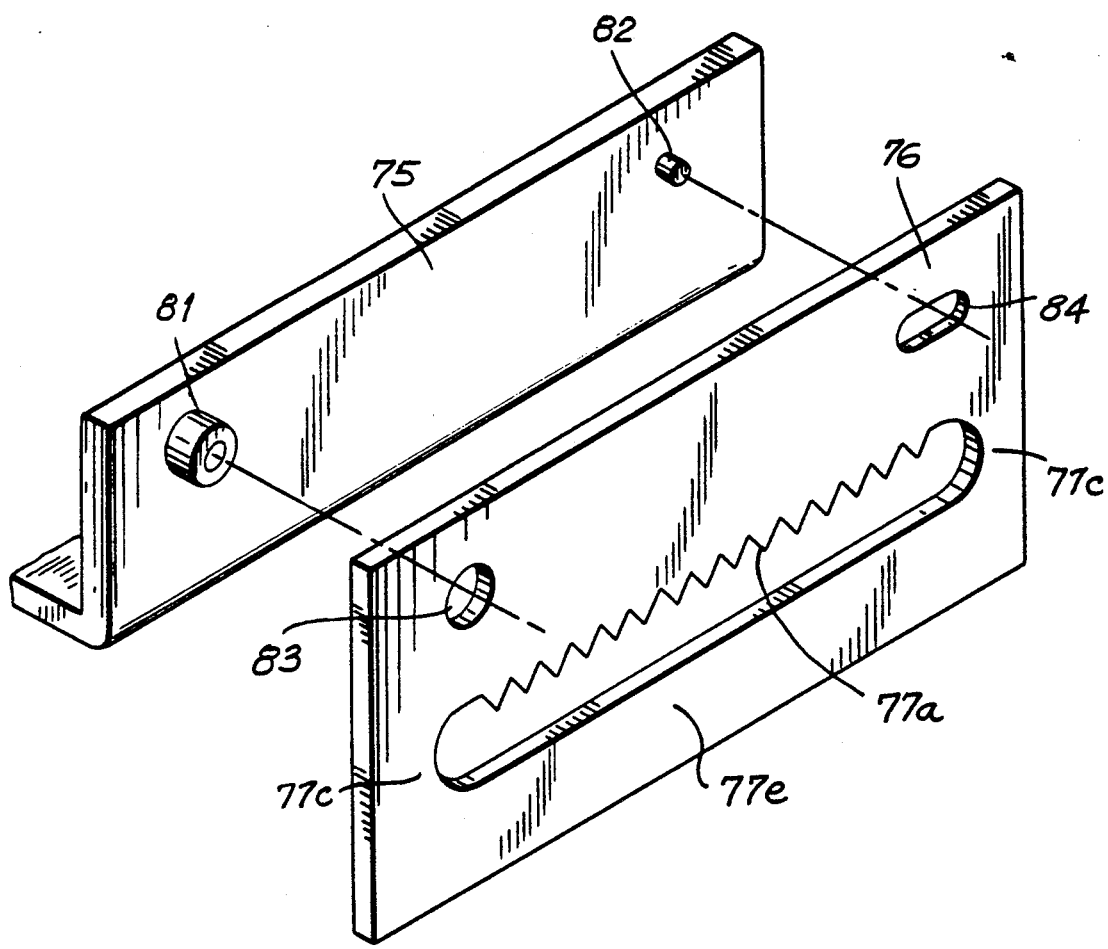
FIG. 15 is an exploded view of a portion of the carriage and rack of the magnetic head feeding device of FIG. 15.

Reference is now made to FIGS. 14 and 15 wherein an alternative embodiment of the invention is depicted. This embodiment differs from the above magnetic head feeding device only in the structure of the rack. A rack bearing plate 75 extends from carriage 3 and supports a rack plate 76. A rack 77a is formed in plate 76, curved side walls 77b and 77c extend from each side of rack 77a and a contour wall 77e extends between walls 77b and 77c opposed to rack 77a. A positioning boss 81 and a guide boss 82 extend from rack bearing plate 75. Rack plate 76 has a positioning aperture 83 and a guide aperture 84 extending therethrough. Bosses 81, 82 on plate 75 extend through apertures 83, 84 respectively in rack plate 76 and act as positioning references between carriage 3 and rack plate 76. Positioning aperture 83 is the positioning means for moving rack plate 76 simultaneously with rack bearing 75 and guide aperture 84 engages with guide boss 82, thereby providing a degree of positioning freedom in the direction of the movement of carriage 3 without any backlash in the direction perpendicular to carriage 3. The relationship between the rack bearing plate 75 and rack plate 76 is determined by the relationship between position boss 81 and positioning aperture 83 and the relationship between guide boss 82 and guide aperture 84 with respect to the direction of movement carriage 3. Rack plate 76 may be affixed to carriage 3 by a bond, such as caulking or the like.

When step motor 6 is driven and pinion 4 engages rack 77a, carriage 3 moves in the desired direction. Position boss 81 and guide boss 82 may also be formed on the rack plate 76 while positioning aperture 83 and guide aperture 84 may be formed on rack bearing plate 75. Furthermore, positioning boss 81 and guide boss 82 are integrally formed as part of bearing plate 75, however they may also be removable pins.

In the above embodiment carriage 3 and rack plate 76 are integrally connected together, yet they are two separate components, and as such provide several benefits and features. For example attrition of the engagement relationship between pinion 4 and rack 77 may occur on occasion which causes variation in the positioning of magnetic head 2. The resulting variation in the read/write track position of the medium is a significant defect in the magnetic recording device and causes a loss of the interchangeability of the medium in the magnetic recording device. However, it now is possible to select a desirable material for rack plate 76 regardless of the material used for carriage 3, so that rack plate 76 may be made of a more durable material without affecting the properties of carriage 3. For example pinion 4 may be composed of an iron and rack 77 may be composed of a copper which has the effect of eliminating attrition, due to material wear.

Secondly, one of the more important factors in the read/write track positioning relationship between magnetic head 2 and the medium, is the positioning relationship of the reference track position. However, in general, magnetic recording devices make use of other electric apparatus or the like or sometimes comprise the whole system, therefore the magnetic recording device is readily subjected to temperature variations from the outside as well as temperature variations from its environment. These temperature variations cause thermal expansion of the components of the magnetic recording device causing variations in the various positioning relationships. Therefore, to prevent the deterioration of the magnetic recording device due to temperature variations, and keep the positioning relationship between the medium and magnetic head 2 in the desired relationship, the effects of thermal variations must be cancelled. To accomplish this, the medium is composed of a resin such as Mylar, frame 10 is composed of steel and carriage 3 is also composed of steel. Rack plate 76 is composed of a copper material whose rate of thermal expansion compensates for the expansion of the medium, frame 10 and carriage 3, cancelling the expansion differences due to the temperature variation. Furthermore, carriage 3 is integrally connected with rack plate 76. In the present structure, the position of the original point of expansion coincides with the position where positioning boss 81 engages positioning aperture 83, thereby securing rack plate 76 to carriage 3. The variations due to thermal expansion may also be easily cancelled by varying the positioning relationship between the position of rack plate 76 and the engagement of pinion 4 and rack 77.

The positioning accuracy of the magnetic head feeding device employing a rack and pinion relies greatly on the accuracy of the rack. Therefore, a high degree of skill and effort is required to manufacture the rack. If as shown in FIG. 7 rack 3a is integrally formed with carriage 3, a high degree of effort must be employed to manufacture all components of carriage 3 at the time of manufacture.

However, in the magnetic head feeding device of FIG. 15, carriage 3 and rack plate 76 are formed separately. Therefore, a high level of skill and effort need only be devoted to manufacturing rack plate 76 thereby lending itself more easily to mass production at a low cost.

Another advantage of mounting rack plate 76 on carriage 3 is that in the prior art device (U.S. Pat. No. 4,428,012) a screw connection is provided to mount the rack to the carriage. However, in the present embodiment mounting is performed by caulking as mentioned above. As the result of this simple structure, increased mounting strength can be obtained, and the device is more easily applicable for automated mass production.

Figure 17:
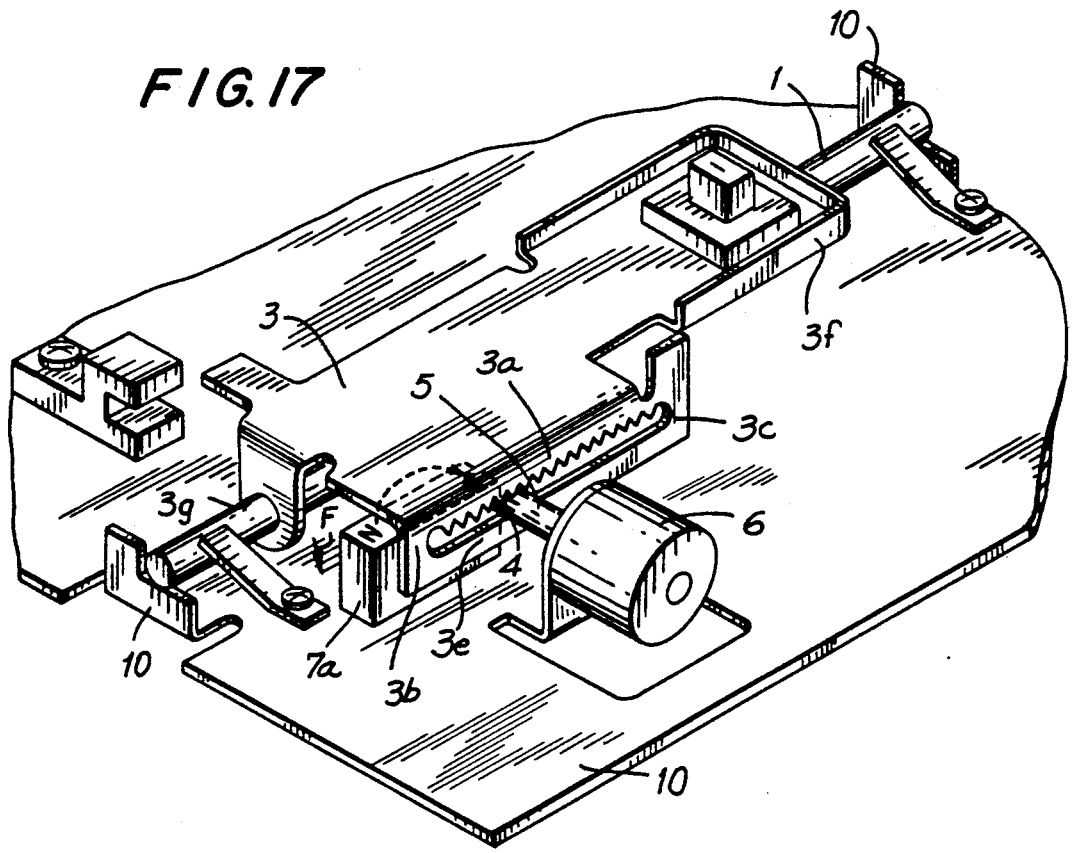
FIG. 17 is a perspective view of a magnetic head feeding device constructed in accordance with another alternative embodiment of the invention.

Reference is now made to FIG. 17 in which another alternative embodiment of the present invention is depicted. This embodiment differs from the originally described invention in that the position of magnet 7a has been changed. Magnet 7a still imparts the engaging force between rack 3a and pinion 4. Slideable and rotatable carriage 3 is again composed of a metal which is attracted to magnet 7a, such as carbon steel plate. Magnet 7a is mounted on frame 10 opposed to carriage 3, and forms a magnetic circuit between carriage 3 and the north and south poles of magnet 7a, as marked with a broken arrow. Magnet 7a acts to secure the position of carraige 3 by imparting a force in the direction of the arrow F.

In this embodiment of the invention, the magnetic print head feeding device operates in the same manner described in the above embodiments. An important feature for producing the engagement bias is that carriage 3 is composed of a metal which is attracted to magnets such as carbon steel plate. Then, when magnet 7a is mounted on frame 10 as opposed to on carriage 3, it makes carriage 3 lighter. As a result of a lighter carriage 3, the efficiency of step motor 6 can be improved, furthermore the hard damage due to shock is also alleviated. For magnet 7a to operate the entire carriage 3 need not be made of steel but, only that portion which cooperates with magnet 7a to provide the magnetic circuit.

Figure 1:
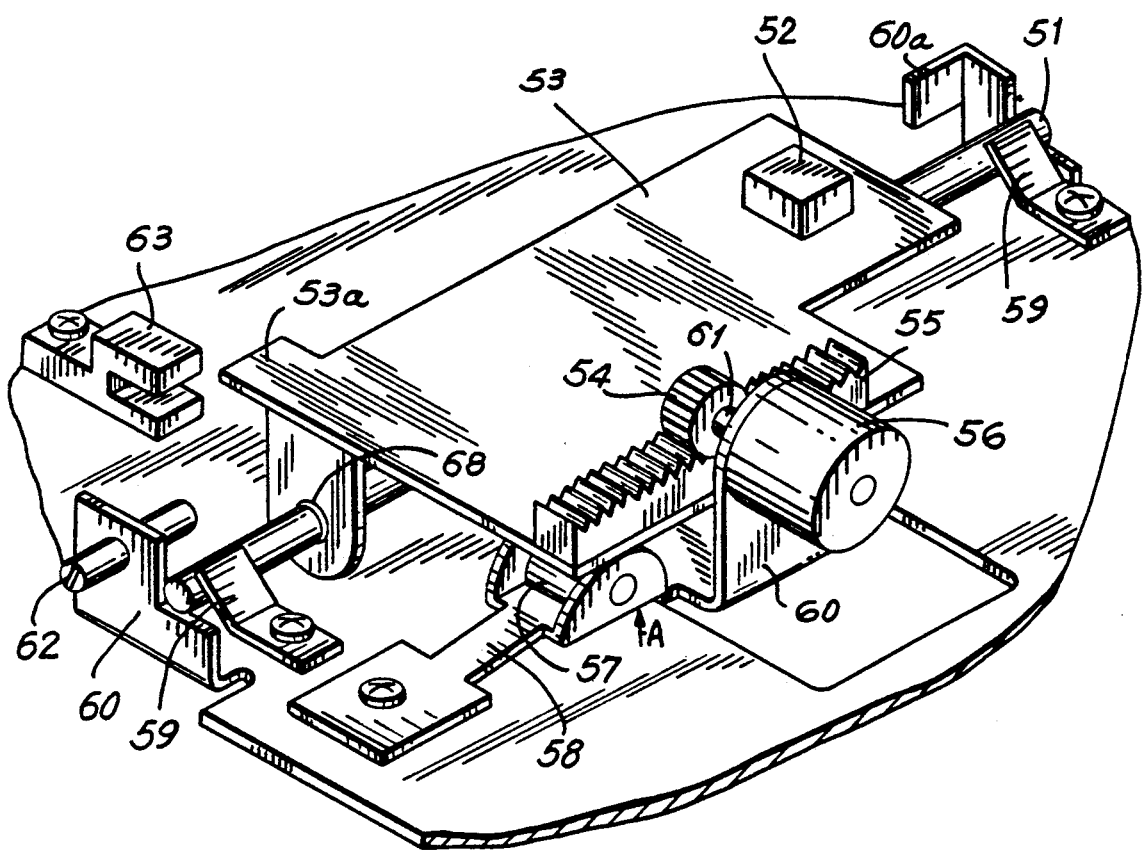
FIG. 1 is a perspective view of a prior art magnetic head feeding device.
Figure 2:
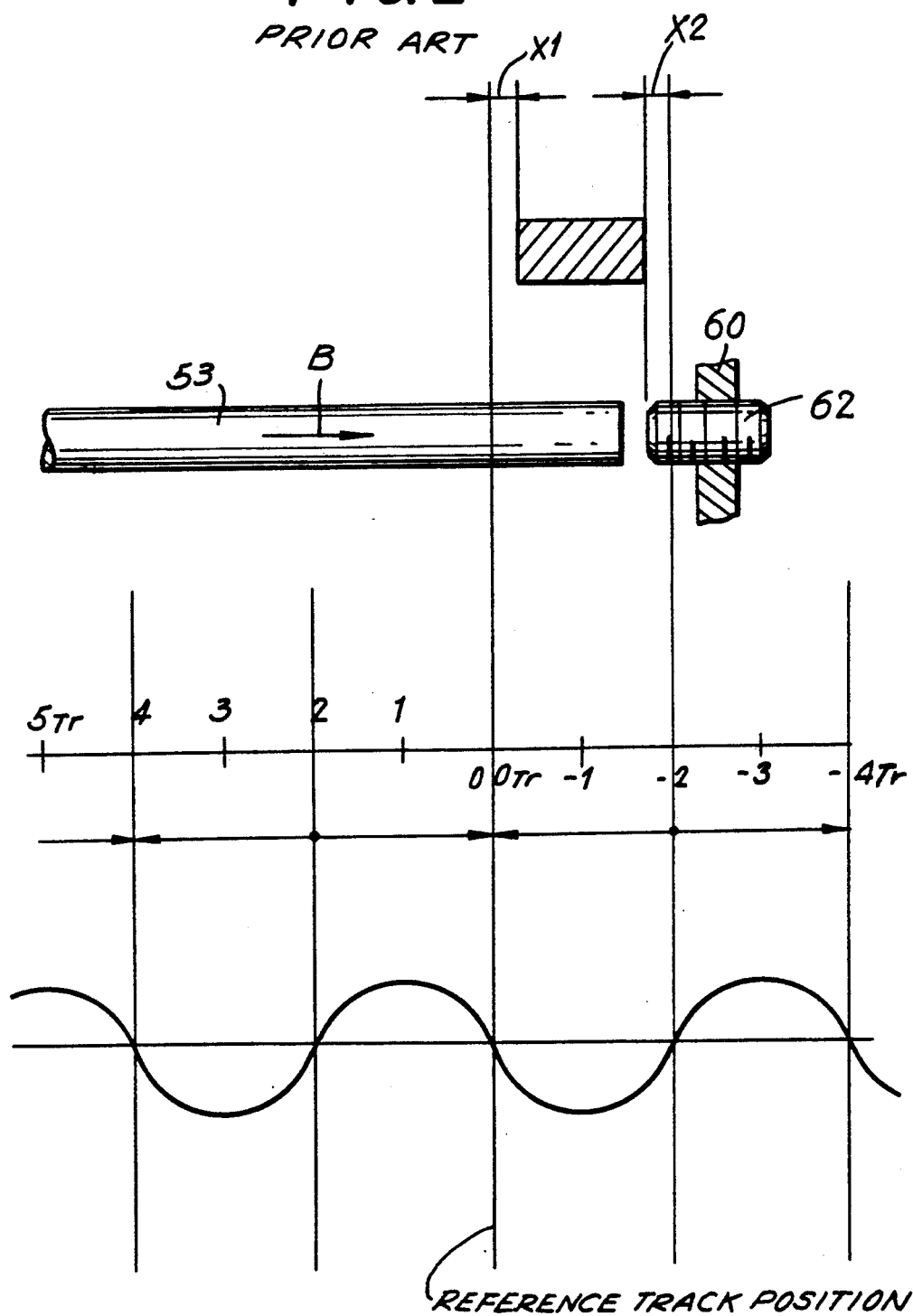
FIG. 2 is a graphic and schematic representation of the control of the prior art magnetic head feeding device of FIG. 1.
Figure 3:
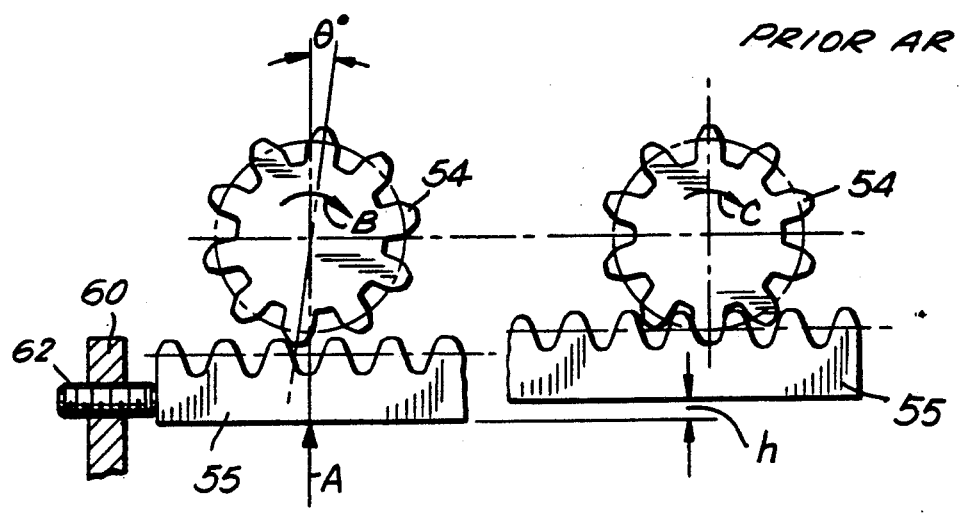
FIG. 3 are front elevation views of the rack and pinion of the prior art magnetic head feeding device of FIG. 1 showing the desired and over-rotated states.
Figure 4:
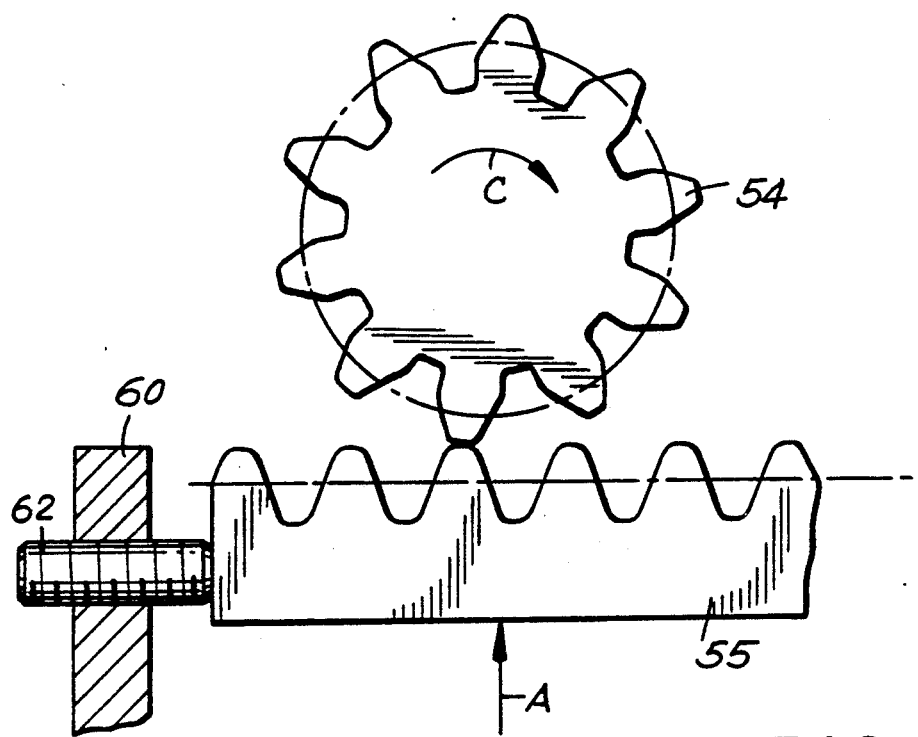
FIG. 4 is a front elevation view of the rack and pinion of a prior art magnetic head feeding device of FIG. 1 showing an extreme over-rotation state.
Figure 5:
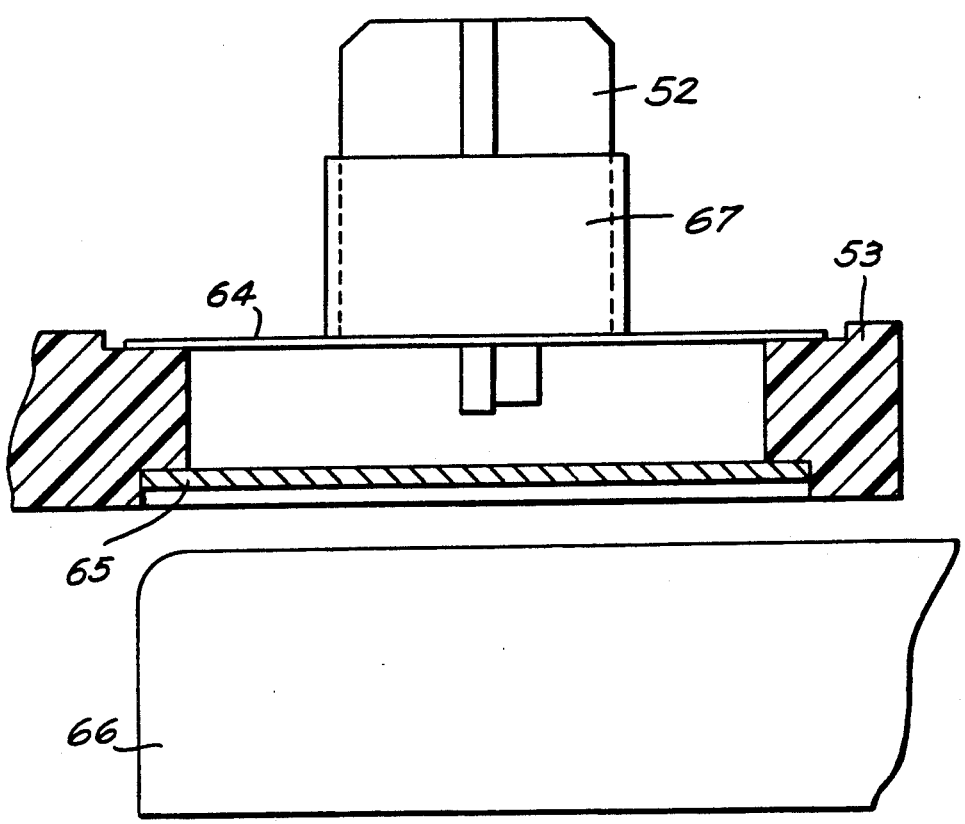
FIG. 5 is a partial sectional view of the magnetic head region of the prior art magnetic head feeding device of FIG. 1.
Figure 6:
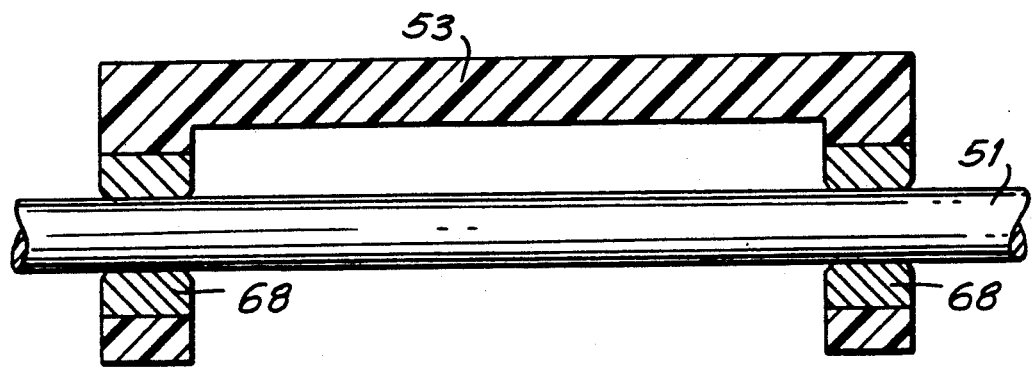
FIG. 6 is a partial sectional view of the coupling between the carriage and guide shaft of the prior art magnetic head feeding device of FIG. 1; FIG.

Moreover, in the magnetic circuit of this embodiment magnet 7a provides double-pole magnetization. However single pole magnetization may also be used. However, if the circuit is formed with a plurality of multipole magnets, it is possible to provide a stable engagement force without leakage of magnetic flux. Furthermore in the embodiment of FIG. 1 and the applied example of FIG. 8, it is also possible to provide the same force as that mentioned above by mounting the magnet at the opposite side of guide shaft 1, using magnet 7 or 7a to repulse carriage 3.

Figure 18:
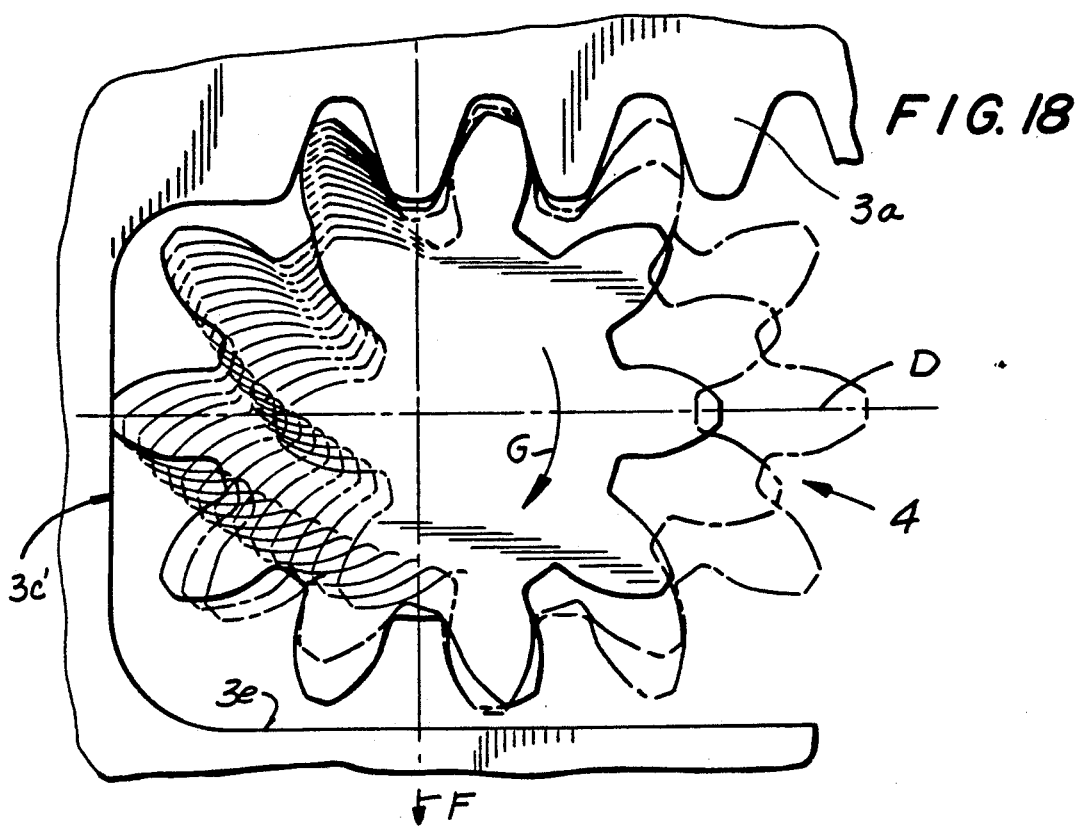
FIG. 18 is a front elevational view of the rack and alternative positions of the pinion during rotation of the other alternative embodiment of the invention of FIG. 17.

Reference is now made to FIGS. 18 an 19 in which the relationship between pinion 4 and wall 3c at the stop position of an alternative embodiment of the invention is provided. Again for simplicity of explanation, rack 3a is considered fixed, and pinion 4 exhibits movement along dashed line D while rotating in the direction of arrow G. FIG. 18 illustrates a locus of projections of individual rotations. The planetary movement of pinion 4 is shown in thin lines and when pinion 4 is adjacent to wall 3c it is depicted with a darker line.

Figure 19:
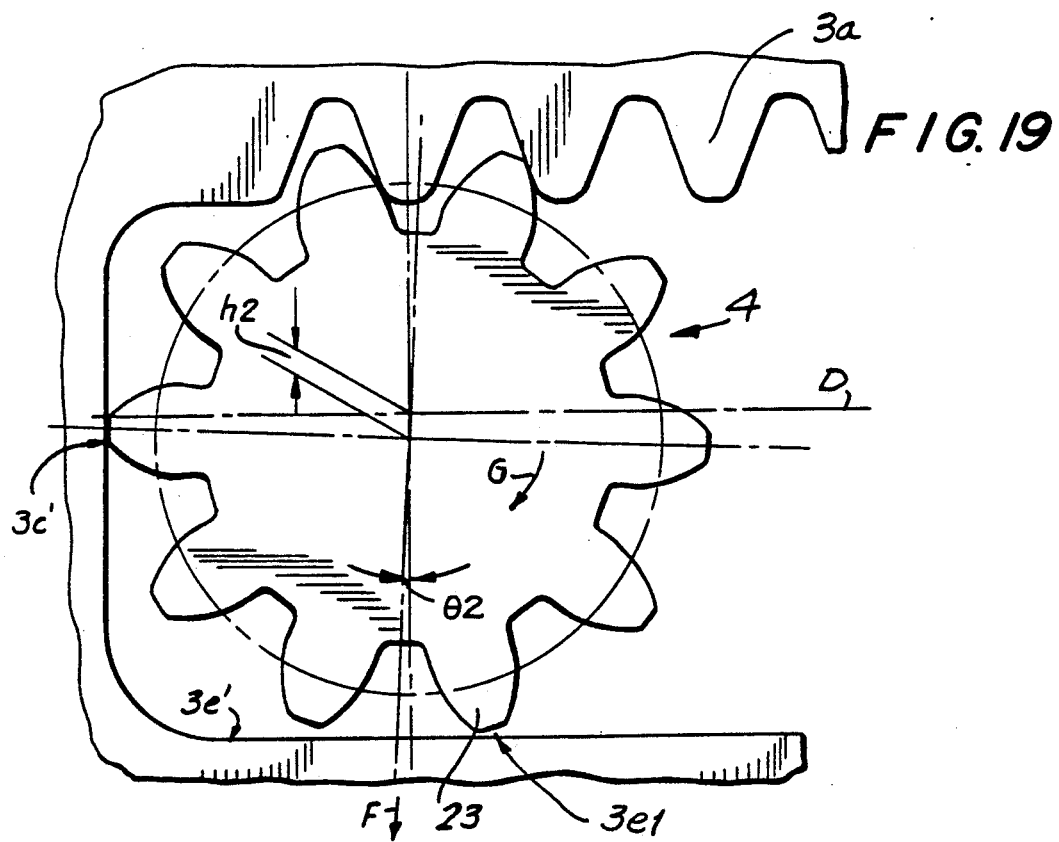
FIG. 19 is a front elevation view of the rack and pinion at a position of over-rotation of the other alternative embodiment of the invention of FIG. 17.

FIG. 19 may be thought of as showing two modes, one in which pinion 4 is rotated, thereby moving rack 3a until pinion 4 is adjacent to side wall 3c' and a second mode in which rack 3a is moved, thereby rotating pinion 4 until pinion 4 abuts side wall 3c'

The stop position of pinion 4 is that marked with the darker line in FIG. 18. However, over rotation of pinion 4 still occurs. It is possible to control the amount of the overrotation, keeping it at a tolerable minimum by determining the relative setting of pinion and rack 3a. FIG. 19 shows the stop position of pinion 4 and rack 3a. The dashed line D indicates the center position of pinion 4 when engaged with rack 3a. There are two modes for minimizing overrotation of pinion 4 in the stop position.

Pinion 4 is rotated moving rack 3a until pinion 4 abuts adjacent wall 3c'. Pinion 4 does not instantaneously stop rotating. As pinion 4 rotates in the direction of arrow G, pinion 4 imparts a rotating force to rack 3a. Since pinion 4 abuts wall 3c and wall 3c acts as a support for rack 3a, rack 3a and carriage 3 are moved a distance against the engaging force present in the direction of arrow F, thereby rotating rack 3a, and carriage 3 through Pinion abuts contour wall 3e of carriage 3 at point 3e' which is a section of contour wall 3e causing the rotation of pinion 4 to stop. The above mode is used for controlling rotation when motor 6 operates incorrectly due to outside noise. Furthermore, in the above stepping mode, it is now possible to have a pinion which need not stop instantaneously with the carriage. Moreover, due to the movement of carriage 3 in the stop position a slight damper effect results.

In the second mode rack 3a is moved causing pinion 4 to rotate until pinion 4 abuts wall 3c'. Since carriage 3 is integrally formed with wall 3c' which abuts pinion 4, further movement of carriage 3 is prevented. When carriage 3 undergoes sudden movement due to hard vibration or shock, pinion 4 cannot immediately stop due to its own inertia. Accordingly, pinion 4 continues to rotate even while abutting wall 3c'. Again pinion 4 imparts a rotating force to rack 3a, causing rack 3a to move a distance h2 against the engaging force of magnet 7 and rotating carriage 3 through angle $\theta2$ in the direction of arrow G. Simultaneously a tooth 23 of pinion 4 contacts contour wall 3e at point 3e' stopping the rotation of pinion 4, and the movement of carriage 3.

It naturally follows that pinion 4 irregularly engages rack 3a in the stop position. The above stopping mode controls the movement of carriage 3 when carriage 3 moves along the guide shaft 1 due to hard vibration and shock. Again pinion 4 does not immediately stop carriage 3 which stops when pinion 4 abuts carriage 3. Furthermore, as in the first mode, during stopping a slight damper effect is experienced.

Accordingly, in each of the above modes the movement of carriage 3 is controlled, while the over-rotation of pinion 4, is kept to a minimum. In each mode the stop for controlling the movement of rack 3a, contour wall 3e, and carriage 3, is wall 3c'.

In the above explanation, rack 3a, wall 3c', and contour wall 3e are disposed in the same plane. However, these three components may be disposed in different planes relative to each other. Furthermore this structure will stop pinion 4 and rack 3a as long as rack 3a engages pinion 4 and wall 3c' abuts either pinion 4 or rotating output shaft 5.

Figure 20:
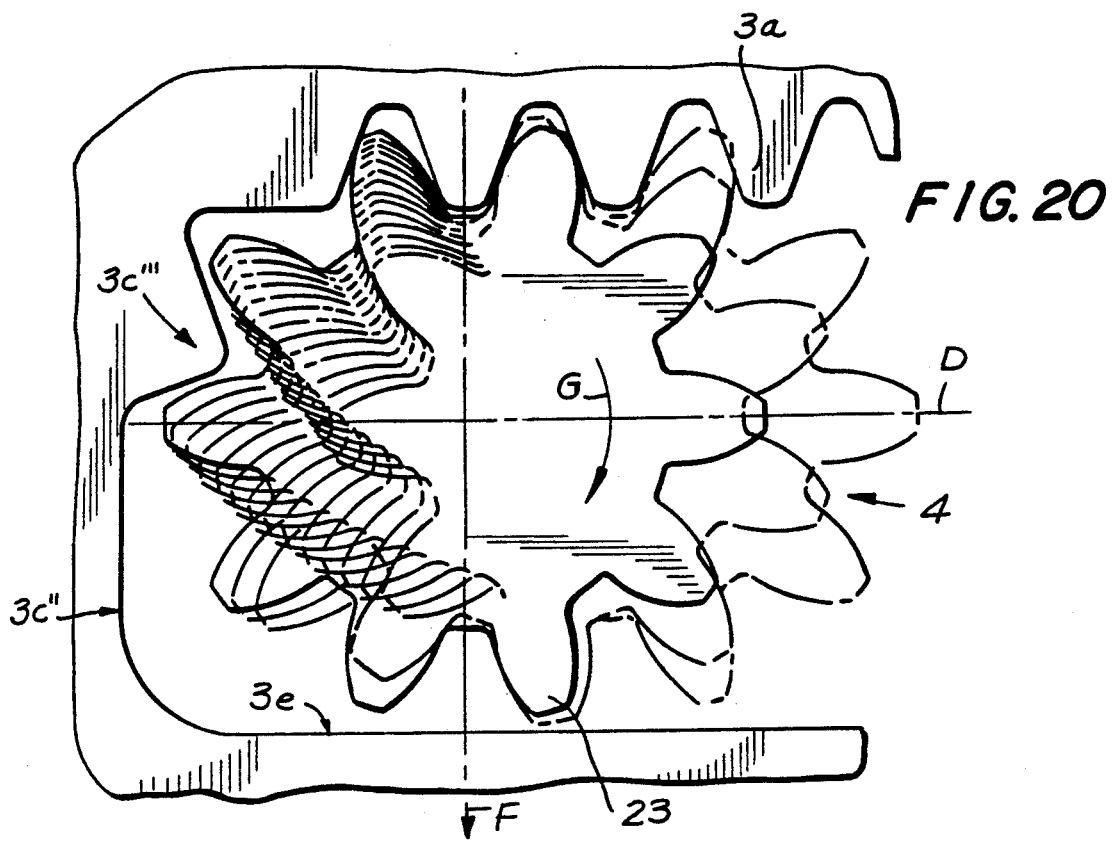
FIG. 20 is a front elevation view of a rack and alternative positions of the pinion of still another alternative embodiment of the invention.
Figure 21:
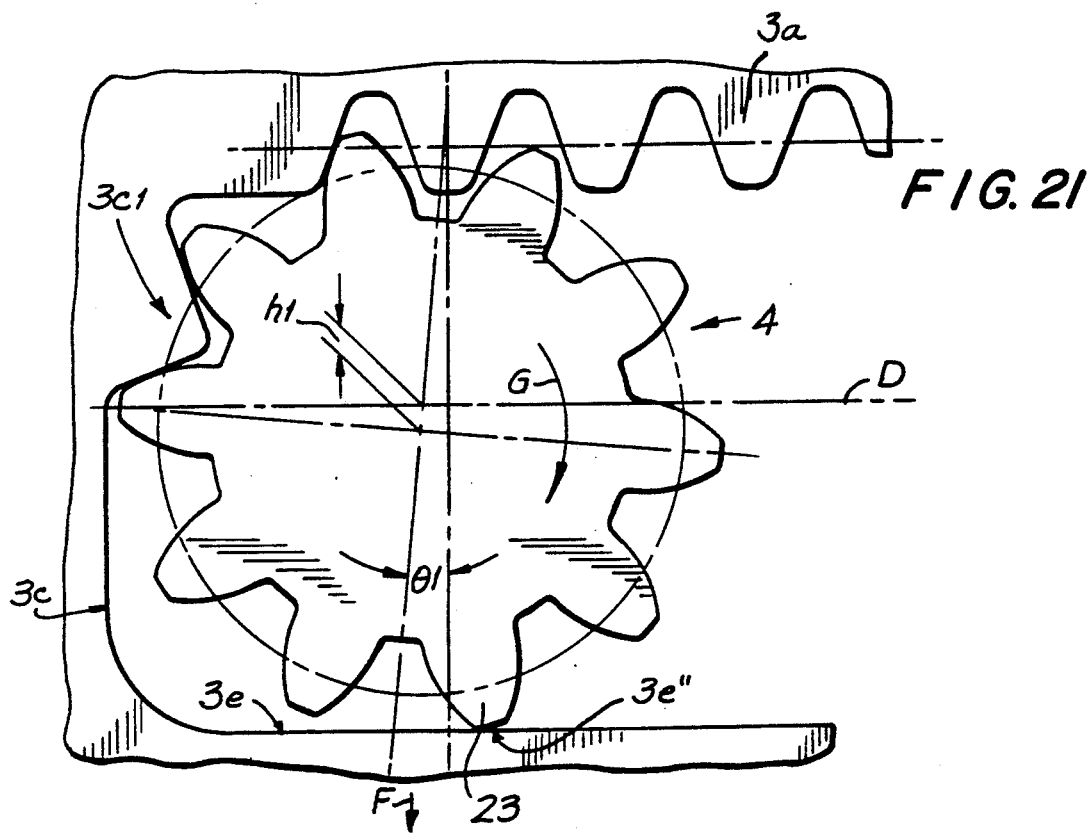
FIG. 21 is a front elevation view of the rack and pinion at position of over-rotation of the still another alternative embodiment of FIG. 20.

Reference is now made to FIGS. 20 and 21 in which the stop position of an alternative embodiment of the magnetic head feeding device is depicted. This embodiment differs from the previous embodiment in that a projection 3c'' extends from wall 3c''. Again for simplicity of explanation, rack 3a is considered fixed and pinion 4 moves along dashed line D while rotating in the direction of arrow G. FIG. 20 depicts projections of pinion 4 as it rotates into the stop position. The movement of pinion 4 is shown by thin lines, while the darker line depicts pinion 4 in the stop position abutting projection 3c''' extending from wall 3c''.

Rack 3a and pinion 4 may be considered to operate in one of two ways. One is that pinion 4 is rotated causing pinion 4 to abut projection 3c'''. The second is that rack 3a is moved, rotating pinion 4 until pinion 4 abuts projection 3c'''.

The optimum stop position for pinion 4 is the position marked by the dark line in FIG. 20. However, pinion 4 still stops with a slight overrotation. However, it is possible to control the amount of overrotation, keeping it to a minium by determining the relative setting of the components. The two modes for stopping pinion 4 with a minimum of overrotation is explained with reference to FIG. 21. Dashed line D represents the center position of pinion 4 in a desired position of engagement with rack 3a. Pinion 4 is rotated, thereby moving rack 3a, until pinion 4 abuts projection 3c'''. However pinion 4 continues to rotate in the direction of arrow G imparting a rotation force to projection 3c'''. This moves rack 3a, and carriage 3 a distance of h1 against the engaging force causing rack 3a, and carriage 3 to rotate through angle $\theta$1 rack 3a, until tooth 23 of pinion 4 is adjacent to point 3e'', a point on contour wall 3e. In the stop position pinion 4 abuts wall 3e at point 3''. The above stopping mode controls the rotation of pinion 4 when step motor 6 suffers an error in operation due to outside noise. Furthermore in the above stopping mode, pinion 4 does not immediately stop with carriage 4. Moreover, during the stopping of pinion 4 and carriage 3 a damper effect results.

In the second mode rack 3a is moved slightly rotating pinion 4 bringing pinion 4 in contact with projection 3c'''. When the carriage 3 is moved, rack 3a rotates pinion 4 in the direction of arrow G. Pinion 4 imparts a force to projection 3c''' moving rack 3a and carriage 3 a distance of h1 against the engagement force in the direction of arrow F, causing pinion 4 to rotate through an angle $\theta$1 in the direction of arrow G. Simultaneously, one part of the pinion 4 rotates into contact with contour wall 3e at point 3e1 stopping the rotation of pinion 4 and the movement of carriage 3.

It follows that when pinion 4 is in the stop position it controls the movement of carriage 3 when carriage 3 moves along guide shaft 1 due to hard vibration, shock or the like. Pinion 4 does not instantaneously stop with carriage 3. Due to the movement of pinion 4 and rack 3a during stopping, a slight damper effect occurs.

In the above two modes, some overrotation of pinion 4 occurs during stopping. However each of these modes stops the movement of carriage 3, with a minimum of overrotation. It is wall 3c which acts as a stop to stop rotation of pinion 4 and movement of rack 3a.

In the above embodiment, rack 3a, wall 3c, and contour wall 3e are in the same plane. However, these three components may each be disposed on different planes. Furthermore, pinion 4 and carriage will be stopped if, rack 3a engages pinion 4, and wall 3c abuts pinion on rotating output shaft 5.

In the prior art, since the pitch of the gear teeth of rack 55 is five times greater than or equal to the track pitch, or the number of gear teeth of pinion 54 is less than or equal to one-fifth the number of steps passed through during the positioning of the track, during positioning one gear tooth of pinion 54 engages with five or more teeth of rack 55. Therefore, when attrition occurs in rack 55 and pinion 54, rack 55 slides relative to pinion 54 causing variation in the positioning of the head.

In the embodiments of FIG. 7 and FIG. 17, the pitch of the track is 187.5 μm, the pitch of gear teeth 11 of rack 3a is 375 μm, which is twice as large as the track pitch. Step motor 6 is a permanent magnetic shaped step motor whose track is divided into 20 equal sections, therefore 1 track is 18 degrees. The diameter of rotating output shaft 5 is 1.5 mm, and gear teeth 23 of pinion 4 are divided into 10 equal parts (module is 0.119), or one half the number of steps in the step motor 6.

Figure 22:
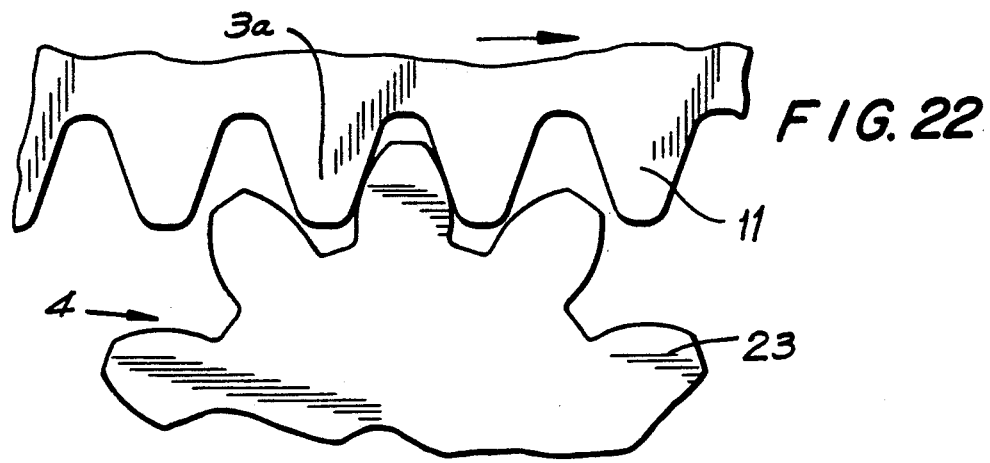
FIGS. 22-24 are partial front elevation views of the rack and pinion at various positions in accordance with the invention.
Figure 23:
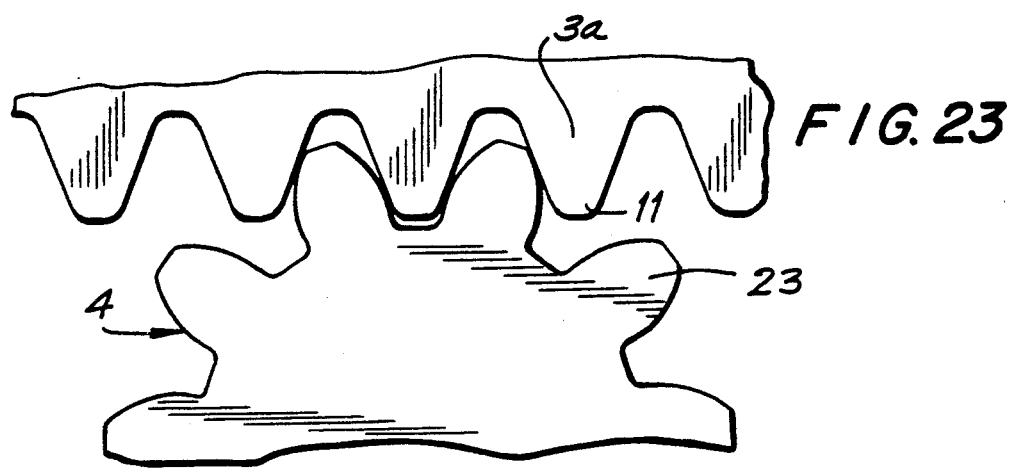
Figure 25:
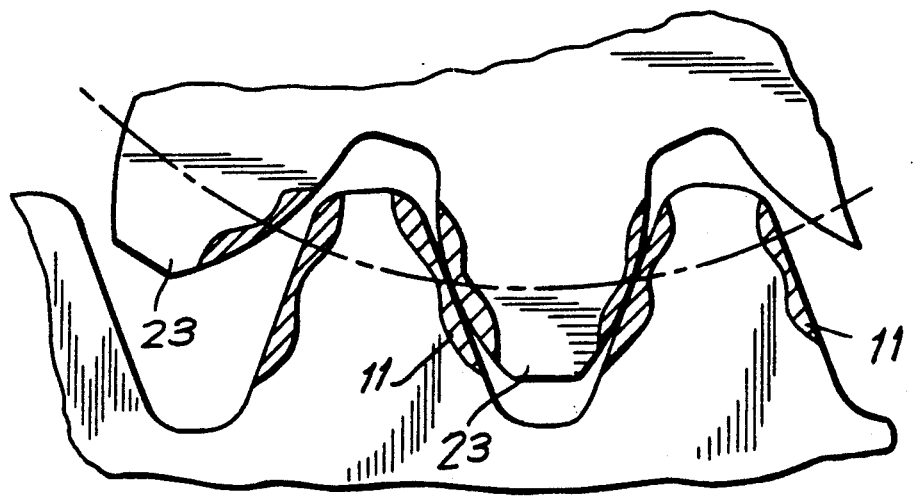
FIG. 25 is a partial front elevation view of the rack and pinion of a prior art magnetic head feeding device.

Reference is now made to FIGS. 22 and 23 in which the interaction of the rack and pinion is depicted. In a preferred embodiment a four-phase permanent step motor is employed in which the phases are actuated by drive signals produced in a 1-2-12 sequence. Therefore, the step motor rotates one step or 18 degreesrees after actuation to the next excitment phase by a single drive signal after having been actuated to a previous phase by a two drive signal sequence. Pinion 4 rotates 18 degrees-rees, therefore the engagement relationship between the pinion 4 and the rack 3a changes from that shown in FIG. 22 to that shown in FIG. 23. Rack 3a rotates one half pitch around the center of rotation of pinion 4 in FIG. 22. Teeth 11 of rack 3a engage teeth 11 of pinion 4 so that both sides of tooth 11 contact equally contact gear tooth 23. Although deterioration of teeth 11 and 23 occurs (as shown in FIG. 25) it is possible to control the effect of this deterioration due to the uniform wear of teeth 11 and teeth 23 resulting from the even engagement. Accordingly it is possible to limit deterioration of the positioning acuracy of the engagement of rack 3a and the pinion 4 because attrition will occur uniformly if gear tooth 11 is adjacent to both inner sides of gear teeth 23 uniformly. However, the positioning inaccuracies may be limited if the insides of the gear teeth 11 do not equally contact gear teeth 23.

In a preferred embodiment the outer diameter of gear teeth 23 of pinion 4 is 1.5 mm. By combining small sized gear teeth having a module of 0.119 and a step motor 6 having few divisions, wherein the step number is 20, pinion 4 can be directly mounted on output shaft 5. Furthermore it is possible to reduce the friction loss of rotating shaft 5 because of the small diameter of shaft 5 as well as to improve the accuracy of pinion 4. Furthermore due to the reduction in friction loss shaft 5 may be directly linked to the metal shaft bearing of the step motor without the need for a costly ball bearing.

Figure 24:
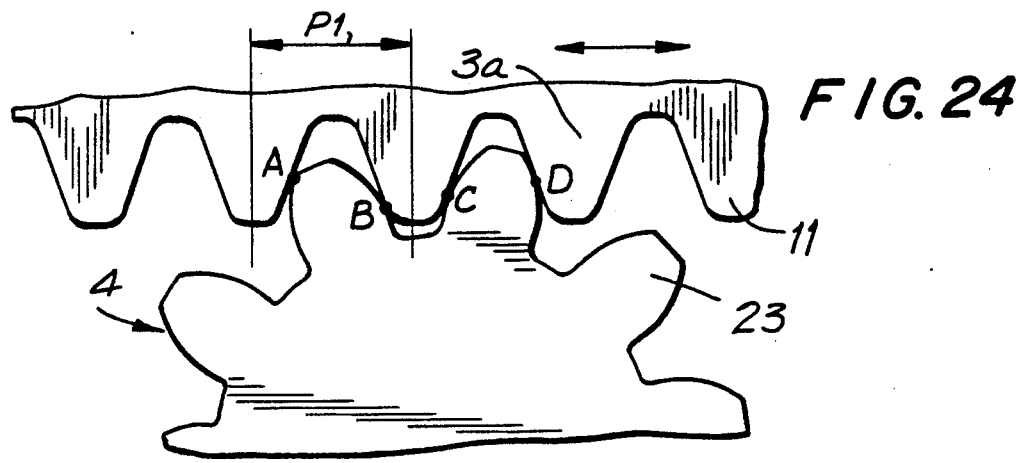

Reference is now made to FIG. 24 wherein the engagement of a rack and pinion of an alternative embodiment of the head positioning device is depicted. Rack 3a engages with pinion 4, coming in contact at four points A, B, C and D. The number of gear teeth 23 of pinion 4 is equal to the stepping number of the step motor 6. Furthermore, pitch P1 of gear teeth 11 of rack 3a is equal to that of the track pitch. As a result, when step motor 6 is rotated one step, gear teeth 23 of pinion 4 and gear teeth 23 of rack 3a also move B, and C, in a manner approximately equivalent to their orientation before stepping. Therefore, when positioning rack 3a at each track position, the accuracy of gear teeth 11 during movement has no affect on the positioning accuracy of the head so long as the pitch accuracy at the points A, B, and C is maintained.

In the above embodiment, the number of gear teeth 23 of pinion 4 is an integer multiple, n, of the stepping number of step motor 6, and the pitch P1 of gear teeth 11 of rack 3a is 1/n as large as the track pitch. Thus, gear teeth 23 of pinion 4 engages with gear teeth 11 of rack 3a at intervals of n, thereby positioning the magnetic head. Therefore, gear teeth 11 of rack 3a and gear teeth 23 of pinion 4 mesh in the same relationship as in the original embodiment Secondly, pitch Pl of gear teeth 11 of rack 3a is 1/n times as great as the track pitch. Thereby, the portion of gear teeth 11 of rack 3a which contacts gear teeth 23 of pinion 4 occurs at intervals n; the same relationship as that in the first embodiment of the invention. Thirdly, the number of gear teeth 23 of pinion 4 is n times as great as the stepping number of step motor 6. Thus, gear teeth 23 of pinion 4 engage with gear teeth 11 of rack 3a at intervals of n, to position magnetic head 2. Therefore, the portion of gear teeth 11 which contact pinion gear teeth 23 engage in the same manner as the first embodiment.

Moreover, a preferred embodiment of the magnetic head feeding device of FIGS. 7 and 17, is applicable to a disc device having a flexible disc diameter of 3.5 inches and a track interval of 187.5 μm. The outer diameter of step motor 6 which is a permanent magnetic (PM type) is 20 mm, and the stepping number during one rotation is 20 steps. Pinion 4 is directly provided on output shaft 5 of step motor 6. The outer diameter of shaft 5 is 1.5 mm, the outer diameter of pinion 4 is 1.48 mm, and the number of gear teeth 23 is 10.

Figure 26:
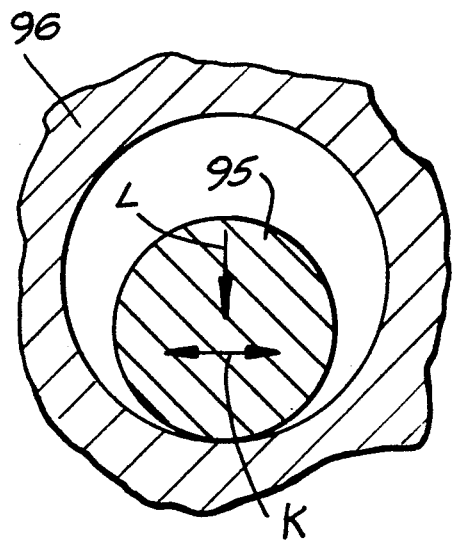
FIG. 26 is a sectional view of the shaft bearing of the step motor in accordance with the invention.

Reference is now made of FIG. 26 in which a sectional view illustrating the relationship between the shaft and the bearing of step motor 6 is provided. A step motor shaft 95 is supported on a metal shaft bearing 96 within step motor 6. There is a clearance between step motor shaft 95 and metal shaft bearing 96. Shaft 95 has a backlash movement in the direction of arrow K. However, step motor shaft 95 is forced in the direction of arrow L by the downward force of magnet 7 and carriage 3, thereby preventing backlash in the direction of arrow K.

As this happens it follows that the smaller the diameter of shaft 95, or the larger the clearance between metal shaft bearing 96 and shaft 95, the smaller the movement of shaft 95 in the direction of arrow K. Accordingly, the engagement force in the direction of arrow L works extremely effectively to counter the backlash movement.

Again as in the previous embodiments by rotating step motor 6 one step, that is, 18 degrees, magnetic head 2 is moved in the direction of arrow E precisely 187.5

μm thereby positioning magnetic head 2 in the desired position.

A preferred embodiment of the invention is discussed below. The weight of carriage 3 is approximately 20 g, therefore it is required to calculate approximately a 10 g attrition load in the direction of arrow E. The holding torque of step motor 6 is 35 g-cm, and the inclination from the stop point of step motor 6 is 2.5 g-cm/degrees of the observed value. Namely, the stop position of the stepping motor varies 1 degree by adding 2.5 g-cm of extraneous load. In the present embodiment, the radius of the circular pitch, namely the point where rack 3a is adjacent to pinion 4, is approximately 0.6 mm. In such circumstances, even though 30 g of force (the weight of the carriage 3 and attrition load) is added to the carriage 3 as the outside load, the load torque becomes $0.6 \times 30 \div 10 = 1.8$ g-cm, thereby moving step motor 6 only 0.7 degrees from the above stop securing point. For example where carriage 3 moves 187.5 μm by one step (18 degrees) of step motor 6, 0.7 degrees corresponds to 7 μm of the movement of carriage 3.

In general, in the disc device utilizing a flexible disc whose diameter is 3.5 inches, since the tolerance deviation of the track position is about 30 μm, the above value of 7 μm is within a tolerable range. However, if the diameter of pinion 4 is made too large, the movement of carriage 3 due to the load also increases. For example, if the diameter of pinion 4 is doubled, the movement of carriage 3 falls within half of the deviation tolerance range of the track position of the whole disc device. Thus, such an increase in size is too great.

Furthermore, although there is 10 to 25 μ of clearance between step motor shaft 95 and metal shaft bearing 96, the effects of this clearance are removed by an engagement force of 90 g. Therefore, the amount f movement of shaft 95 in the direction of the arrow K is immeasurably slight. The torque T due to the pressurizing force of shaft 95 and metal shaft bearing 96 can be expressed as $T = 90 \times 0.75 \div 10 \times 0.2 = 1.35$ g-cm, wherein the pressurizing force is 90 g, the radius of shaft 95 is 0.75 mm, and the frictional coefficient $\mu = 0.2$. Where the stop position of the stepping motor varies 1 degree by adding 2.5 g-cm of outside load, carriage 3 moves 187.5 μm in one step (18 degrees) of motor 6. Therefore, the above expression becomes $$187.5 \div 18 \div 2.5 \times 1.35 = 5.6 \, \mu m$$

Namely, it is found that the movement of carriage 3 is only 5.6 m. Accordingly, shaft 95 of stop motor 6 is made thin, thereby controlling the movement of the stop position of carriage 3 caused by the outside load and the damage of the shaft bearing. Furthermore, there is no need to use a ball bearing at shaft bearing 96, thereby allowing use of a metal shaft.

In another embodiment where the disc device utilizes a 5.25 inch flexible disc and whose track interval is 264.6 μm, the PM step motor has a step number during one rotation of 24, and an outside diameter of 32 mm, thereby making the diameter of shaft 95 62 mm, and pinion 4 having an outside diameter of 1.98 mm. Accordingly, the same result as that in the 3.5 inch disc device as mentioned above can be obtained.

It is needless to say, in other embodiments such as the 3.5 inch disc device whose track interval is 375 μm or the 5.25 inch disc device whose track interval is 539.2 μm, the desirable movement amount is obtained by rotating the stepping motor two steps, respectively. Furthermore, the present embodiment is useable for a disc device whose flexible disc diameter is 8 inches and a disc device whose flexible disc diameter is 2.5 inches or 2 inches.

In disc device embodiments whose flexible disc diameter is at least 4 inches, the outer diameter of pinion 4 is 2.1 mm or less, the outer diameter of step motor 6 is 42 mm or less, and the stepping number during one rotation of step motor 6 is 48 steps or less. Whereas in the disc device, embodiments whose flexible disc diameter is less than 4 inches, the outer diameter of pinion 4 is 1.6 mm or less, the outer diameter of step motor 6 is 32 mm or less, and the stepping number during one rotation of the stepping motor is 32 steps or less. Accordingly, accurate positioning of magnetic head 2 can be achieved for a variety of sizes.

By providing a rack and pinion magnetic head feeding device which provides an engagement force without the use of springs, a side wall and countour wall adjacent the rack, an improved magnetic head feeding device, having a simple structure for providing positioning accuracy is provided. As a result stable mass production of the magnetic head feeding device may be easily accomplished at low cost.

It will thus be seen that the objects set forth above, among those made apparent from the preceding description, are efficiently attained and since certain changes may be made in the above construction without departing from the spirit and scope of the invention, is intended that all matter contained in the above description and shown in the accompanying drawings shall be interpreted as illustrative and not in a limiting sense.

It is also to be understood that the following claims are intended to cover all of the generic and specific features of the invention which as a matter of language might be said to fall therebetween.

What is claimed is:

1. A magnetic head feeding device comprising:
   a guide;
   a carriage slideably and rotatably mounted on the guide, the carriage being reciprocally moveable in a direction along the guide;
   a magnetic head mounted on the carriage;
   a rack member formed with an opening for defining a rack mounted on the carriage and extending essentially parallel to the direction along the guide, the rack member including stop means and disengagement prevention means integrally formed in the rack member;
   a pinion means engaged with the rack for moving the carriage along the guide when the pinion means is rotated;
   motor means for rotating the pinion means in a reciprocating manner; and
   an output shaft rotated by the motor means, the pinion means being mounted on the output shaft;
   the stop means controlling the rotation of the pinion means and the movement of the carriage and comprising the opening formed in the rack, a first side wall and an opposed second side wall at the respective ends of the rack to stop rotation of the pinion means at the ends of the rack, and the disengagement prevention means preventing disengagement of the rack from the pinion means and including a disengagement wall opposite and spaced from the rack, the distance between the disengagement wall and the rack being slightly greater than the dimension of the pinion means.

2. The magnetic head feeding device of claim 1, wherein the stop means is in registration with the pinion means, the stop means including a projection formed on at least one of the side walls, the projection being formed adjacent the end of the rack for engagement by the pinion means to stop the rotation of the pinion means and displacement of the carriage.

3. The magnetic head feeding device of claim 1, the stop means including a wall facing and spaced from the rack in registration with the pinion means at least in the region adjacent to at least one of the side wall, the rotation of the pinion means being stopped by engagement of the pinion means with the rack and facing wall.

4. The magnetic head feeding device of claim 1, adapted for use with a recording medium, further comprising a plurality of teeth integrally formed on the rack, the pitch of the teeth being less than twice the track pitch of the recording medium.

5. The magnetic head feeding device of claim 1, adapted for use with a recording medium having a diameter no less than 4 inches, wherein the diameter of the output shaft is no more than 2.1 millimeters.

6. The magnetic head feeding device of claim 1, adapted for use with a recording medium and wherein said pinion means includes a pinion mounted on the output shaft, the diameter of the output shaft being no more than 1.6 millimeters and the recording medium is a disc, the disc diameter being no more than 4 inches.

7. The magnetic head feeding device of claim 1, further comprising a spacer mounted on the carriage, the magnetic head being mounted on a non-magnetic spacer, the carriage being formed with a rim about the periphery of the magnetic head the carriage being formed of a material having a high permeance at least in the region beneath the magnetic head and in said rim, thereby shielding the magnetic head from outside magnetic leaks.

8. The magnetic head feeding device of claim 7, for use with a magnetic medium, the magnetic head having a head core, and including an annular magnetic shield member supported so as to extend about the head core of the magnetic head, the annular magnetic shield member being formed of a material of high permeance and essentially lying in a plane extending parallel to the magnetic medium.

9. The magnetic head feeding device of claim 1, wherein said rack, said stop means and said disengagement prevention means are integrally formed as a plate member affixed to said carriage.

10. The magnetic head feeding device of claim 9, wherein said plate member is integrally formed with said carriage.

11. The magnetic head feeding device of claim 1, wherein the pinion means includes a pinion mounted on the output shaft, the disengagement wall is a contour wall supported opposite and spaced from the rack for displacement with the rack as a unit, the contour wall being in registration with at least one of the output shaft and pinion, the distance between the contour wall and the rack being slightly greater than one of the diameter of the pinon or output shaft whereby the pinon is able to rotate along the rack and remain in contact with the rack, the contour wall limiting the displacement of the pinion in a direction to disengage the pinion from the rack.

12. The magnetic head feeding device of claim 11, wherein the surface of the first side wall and the second side wall is formed as an arc having a diameter larger than the diameter of the pinion.

13. The magnetic head feeding device of claim 12, wherein the stop means is in registration with the pinion, the pinion engaging either the first side wall or the second side wall and rack to stop the rotation of the pinion and displacement of the carriage.

14. The magnetic head feeding device of claim 1, further comprising control means for controlling the position of the magnetic head.

15. The magnetic head feeding device of claim 14, wherein the output shaft carries the pinion means, and the control; means includes the motor means having an output portion rotatable concentrically with the shaft for positioning the magnetic head; and means for securing the outer portion of the motor means from rotation during operation.

16. The magnetic feeding device of claim 14, wherein the control means includes an adjustable movement means for selectively displacing the motor means in the direction of reciprocating movement of the carriage.

17. The magnetic head feeding device of claim 1, wherein said pinion means is a pinion and said output shaft is a motor shaft.

18. A magnetic head feeding device of claim 17, wherein the outer surface of the pinon forms teeth, the motor means is a step motor and the number of pinion teeth is at least one half the step number of one rotation of the step motor.

19. The magnetic head feeding device of claim 17, wherein the surface of the first side wall and the second side wall is formed as an arc having a diameter larger than the diameter of the pinion.

20. The magnetic head feeding device of claim 19, wherein the stop means is in registration with the pinion means, the pinion means engaging either of first side wall or second side wall and rack to stop the rotation of the pinion and displacement of the carriage.

21. The magnetic head feeding device of claim 1, further comprising pressure imparting means for imparting an engagement force between the rack and pinion means without contacting the carriage.

22. The magnetic head feeding device of claim 21, wherein the pressure imparting means includes magnet means for imparting said engagement force by either magnetic attraction or magnetic repulsion.

23. The magnetic head feeding device of claim 21, wherein the pressure imparting means comprises a fixed support; and a magnet supported on one of the carriage and the fixed support and positioned on the same side of the guide as the rack, at least the portion of the other of the fixed support and carriage in registration with the magnet being made of a material attracted by the magnet, the magnet and magnetically attracted material not coming in contact with each other.

24. The magnetic head feeding device of claim 21, wherein the pressure imparting means comprises a fixed support; a first magnetic means supported on one of the carriage and the fixed support and positioned on the opposite side of the guide as the rack; and a second magnetic means selected for magnetic repulsion to said first magnetic means supported on the other of the carriage and the fixed support in registration with the first magnetic means during the sliding displacement of the carriage, the first and second magnetic means not coming in contact with each other.

25. The magnetic head feeding device of claim 21, adapted for use with a recording medium, further comprising a plurality of teeth integrally formed on the rack, the pitch of the teeth being less than twice the track pitch of the recording medium.

26. A magnetic head feeding device of claim 21, wherein the pinion means includes a pinion and the outer surface of the pinion forms teeth, the motor means is a step motor and the number of pinion teeth is at least one half the step number of one rotation of the step motor.

27. The magnetic head feeding device of claim 21, adapted for use with a recording medium having a diameter no less than 4 inches, wherein the diameter of the output shaft is no more than 2.1 millimeters.

28. The magnetic head feeding device of claim 21, adapted for use with a recording medium and wherein said pinion means includes a pinion mounted on the output shaft and the recording medium is a disc, the diameter of the output shaft being no more than 1.6 millimeters and the disc diameter being no more than 4 inches.

29. The magnetic head feeding device of claim 21, further comprising a spacer mounted on the carriage, the magnetic head being mounted on a non-magnetic spacer, the carriage being formed with a rim about the periphery of the magnetic head the carriage being formed of a material having a high permeance at least in the region beneath the magnetic head and in said rim, thereby shielding the magnetic head from outside magnetic leaks.

30. The magnetic head feeding device of claim 21, for use with a magnetic medium, the magnetic head having a head core, and including an annular magnetic shield member supported so as to extend about the head core of the magnetic head, the annular magnetic shield member being formed of a material of high permeance and essentially lying in a plane extending parallel to the magnetic medium.

31. The magnetic head feeding device of claim 21, wherein the rack is formed separate from the carriage and joined thereto.

32. The magnetic head feeding device of claim 31, wherein the coupling of the rack to said carriage permits independent thermal dimensional changes of the carriage and rack, the material of the rack being selected to compensate for differences in thermal dimensional changes between the carriage and the medium used with the device.

33. The magnetic head feeding device of claim 21, wherein said pinion means includes a pinion, the output shaft carrying the pinion, the disengagement wall is a contour wall supported opposite and spaced from the rack for displacement with the rack as a unit, the contour wall being in registration with either the output shaft or pinion, the distance between the contour wall and the rack member being slightly greater than one of the diameter of the pinion or output shaft whereby the pinion is able to rotate along the rack and remain in contact with the rack, the contour wall limiting the displacement of the pinion in a direction to disengage the pinion from the rack.

34. The magnetic head feeding device of claim 33, wherein the stop means is in registration with the pinion, the stop means including a projection formed on at least one of the side walls, the projection being formed adjacent the end of the rack member for engagement by the pinion to stop the rotation of the pinion and displacement of the carriage.

35. The magnetic head feeding device of claim 33, the contour wall being in registration with the pinion and the rotation of the pinion being stopped by engagement of the pinion with the contour wall and rack.

36. The magnetic head feeding device of claim 33, wherein the surface of the first side wall and the second side wall is formed as an arc having a diameter larger than the diameter of the pinion.

37. The magnetic head feeding device of claim 36, wherein the stop means is in registration with the pinion, the pinion engaging either the first side wall or the second side wall and rack to stop the rotation of the pinion and displacement of the carriage.

38. A magnetic head feeding device comprising:
a guide;
a carriage slideably and rotatably mounted on the guide, the carriage being reciprocally moveable in a direction along the guide;
a magnetic head mounted on the carriage;
a rack mounted on the carriage and extending essentially parallel to the direction along the guide;
a pinion engaged with the rack for moving the carriage along the guide when the pinion is rotated;
motor means for rotating the pinion in a reciprocating manner;
pressure imparting means for imparting an engagement force between the rack and the pinion without contacting the carriage;
stop means for preventing further movement of the carriage in a selected direction; and
disengagement prevention means for preventing disengagement of the rack from the pinion, wherein the rack, the stop means and the disengagement prevention means are integrally formed with the carriage.

39. The magnetic head feeding device of claim 38, wherein the pressure imparting means includes magnet means for imparting said engagement force by either magnetic attraction or magnetic repulsion.

40. The magnetic head feeding device of claim 38, wherein the pressure imparting means comprises a fixed support; and a magnet supported on one of the carriage and fixed support and positioned on the same side of the guide as the rack, at least the portion of the other of the fixed support and carriage in registration with the magnet being made of a material attracted by the magnet, the magnet and magnetically attracted material not coming in contact with each other.

41. The magnetic head feeding device of claim 38, wherein the pressure imparting means comprises a fixed support; a first magnetic means supported on one of the carriage and the fixed support and positioned on the opposite side of the guide as the rack; and a second magnetic means selected for magnetic repulsion to said first magnetic means supported on the other of the carriage and the fixed sliding displacement of the carriage; the first and second magnetic means not coming in contact with each other.

42. The magnetic head feeding device of claim 38, including an output shaft rotated by the motor means and carrying the pinion, the disengagement prevention means comprising a contour wall support opposite and spaced from the rack for displacement with the rack as a unit, the contour wall being in registration with at least one of the output shaft and pinion, the distance between the contour wall and the rack being slightly greater than on of the diameter of the pinion or output shaft whereby the pinion is able to rotate along the rack and remain in contact with the rack, the contour wall limiting the displacement of the pinion in a direction to disengage the pinion from the rack.

43. The magnetic head feeding device of claim 38, further comprising control means for controlling the position of the magnetic head.

44. A magnetic head feeding device comprising:
a guide;
a carriage slideably and rotatably mounted on the guide, the carriage being reciprocally moveable in a direction along the guide;
a magnetic head mounted on the carriage;
a rack mounted on the carriage and extending essentially parallel to the direction along the guide;
a pinion engaged with the rack for moving the carriage along the guide when the pinion is rotated;
motor means for rotating the pinion in a reciprocating manner;
stop means for stopping movement of the carriage in a selected direction; and
disengagement prevention means for preventing disengagement of the rack from the pinion, wherein the rack, the stop means and the disengagement prevention means are integrally formed with the carriage as a unitary rack member.

45. A magnetic head feeding device comprising:
a guide;
a carriage slideably and rotatably mounted on the guide, the carriage being reciprocally moveable in a direction along the guide;
a magnetic head mounted on the carriage;
a rack mounted on the carriage and extending essentially parallel to the direction along the guide;
a pinion engaged with the rack for moving the carriage along the guide when the pinion is rotated;
motor means for rotating the pinion in a reciprocating manner;
stop means for stopping movement of the carriage in a selected direction;
disengagement prevention means for preventing disengagement of the rack from the pinion, wherein the rack, the stop means and the disengagement prevention means are integrally formed with the carriage as a unitary rack member; and
an output shaft rotated by the motor means and carrying the pinion, the disengagement prevention means comprising a contour wall supported opposite and spaced from the rack for displacement with the rack as a unit, the contour wall being in registration with either the output shaft or pinion, the distance between the contour wall and the rack being slightly greater than one of the diameter of the pinion or output shaft whereby the pinion is able to rotate along the rack and remain in contact with the rack, the contour wall limiting the displacement of the pinion in a direction to disengage the pinion from the rack.

46. A magnetic head feeding device comprising:
a guide;
a carriage slideably and rotatably mounted on the guide, the carriage being reciprocally moveable in a direction along the guide;
a magnetic head mounted on the carriage;
a rack mounted on the carriage and extending essentially parallel to the direction along the guide;
a pinion engaged with the rack for moving the carriage along the guide when the pinion is rotated;
motor means for rotating the pinion in a reciprocating manner;
stop means for stopping movement of the carriage in a selected direction; and
disengagement prevention means for preventing disengagement of the rack from the pinion, wherein the rack, the stop means and the disengagement prevention means are integrally formed with the carriage as a unitary rack member;
and pressure imparting means for imparting an engagement force between the rack and pinion without contacting the carriage.

47. The magnetic head feeding device of claim 46, wherein the pressure imparting means includes magnet means for imparting said engagement force by either magnetic attraction or magnetic repulsion.

48. The magnetic head feeding device of claim 46, wherein the pressure imparting means comprises a fixed support; and a magnet supported on one of the carriage and fixed support and positioned on the same side of the guide as the rack, at least the portion of the other of the fixed support and carriage in registration with the magnet being made of a material attracted by the magnet, the magnet and magnetically attracted material not coming in contact with each other.

49. The magnetic head feeding device of claim 46, wherein the pressure imparting means comprises a fixed support; a first magnetic means supported on one of the carriage and the fixed support and positioned on the opposite side of the guide as the rack; and a second magnetic means selected for magnetic repulsion to said first magnetic means supported on the other of the carriage and the fixed support in registration with the first magnetic means during the sliding displacement of the carriage, the first and second magnetic means not coming in contact with each other.

50. A magnetic head feeding device comprising:
a guide;
a carriage slideably and rotatably mounted on the guide, the carriage being reciprocally moveable in a direction along the guide;
a magnetic head mounted on the carriage;
a rack mounted on the carriage and extending essentially parallel to the direction along the guide;
a pinion engaged with the rack for moving the carriage along the guide when the pinion is rotated;
motor means for rotating the pinion in a reciprocating manner;
stop means for stopping the carriage from travelling in a selected direction;
disengagement prevention means for preventing disengagement of the rack from the pinion; and
control means for controlling the position of the magnetic head, wherein the rack, the stop means and the disengagement prevention means are integrally formed with the carriage as a unitary rack member.

51. The magnetic head feeding device of claim 50, and including an output shaft rotated by the motor means and carrying the pinion, the control means comprising the motor means having an output portion rotatable concentrically with the shaft for positioning the magnetic head; and means for securing the outer portion of the motor means from rotation during operation.

52. The magnetic feeding device of claim 50, wherein the control means includes an adjustable movement means for selectively displacing the motor means in the direction of reciprocating movement of the carriage.

* * * * *